United States Patent
VanEssen et al.

(10) Patent No.: US 6,591,004 B1
(45) Date of Patent: Jul. 8, 2003

(54) SURE-FIT: AN AUTOMATED METHOD FOR MODELING THE SHAPE OF CEREBRAL CORTEX AND OTHER COMPLEX STRUCTURES USING CUSTOMIZED FILTERS AND TRANSFORMATIONS

(75) Inventors: David C. VanEssen, St. Louis, MO (US); Charles H. Anderson, St. Louis, MO (US); Heather A. Drury, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 09/396,119

(22) Filed: Sep. 14, 1999

Related U.S. Application Data

(60) Provisional application No. 60/101,242, filed on Sep. 21, 1998.

(51) Int. Cl.[7] .................................................. G06K 9/00
(52) U.S. Cl. ........................... 382/154; 128/922; 378/4; 600/410
(58) Field of Search .................................. 382/131, 154; 378/4, 21, 901; 128/922; 600/407, 410; 345/420, 424

(56) References Cited

U.S. PATENT DOCUMENTS

| | | | | |
|---|---|---|---|---|
| 5,224,179 A | * | 6/1993 | Denker et al. | 382/259 |
| 5,384,866 A | * | 1/1995 | Kumagai | 382/259 |
| 5,703,965 A | * | 12/1997 | Fu et al. | 382/232 |
| 5,832,922 A | * | 11/1998 | Schotland | 356/337 |
| 5,836,872 A | * | 11/1998 | Kenet et al. | 382/128 |
| 5,974,521 A | * | 10/1999 | Akerib | 712/11 |
| 6,002,738 A | * | 12/1999 | Cabral et al. | 378/15 |
| 6,366,797 B1 | * | 4/2002 | Fisher et al. | 128/922 |

OTHER PUBLICATIONS

Alirezaie, J. et al., "Neural Network–based Segmentation of Magnetic Resonance Images of the Brain," 1997, IEEE Trans. Nucl. Sci. 44:194–198.

Clarke, L.P., et al., "MRI Segmentation: Methods and Applications," 1995, Magn. Reson. Imaging, 13:343–368.

Clarke, L.P., "MRI Stability of Three Supervised Segmentation Techniques," 1992, Magn. Reson. Imaging 11:95–106.

Cohen, G., et al., "Segmentation Techniques for the Classification of Brain Tissue Using Magnetic Resonance Imaging," 1992,Psychiatry Res. 45:33–51.

(List continued on next page.)

*Primary Examiner*—Samir Ahmed
*Assistant Examiner*—Anand Bhatnagar
(74) *Attorney, Agent, or Firm*—Senniger, Powers, Leavitt & Roedel

(57) ABSTRACT

A method for reconstructing surfaces and analyzing surface and volume representations of the shape of an object or structure corresponding to image data, in which the structure has been modeled as one or more physically distinct compartments. The characteristics of a compartmental model are specified in terms of the material types contained in each distinct compartment and in terms of the nature of compartmental boundaries as defined by the image data. An image model that includes scalar or vector image intensity functions for each material type and for each boundary type defined by the image data is specified. Gradient functions that characterize each boundary type and some compartmental regions are specified. A set of probabilistic volume representations of the location of different compartments and the location and orientation of compartmental boundaries is generated. A combination of these probabilistic representations is used to generate a segmented volume and explicit surface reconstructions representing the shape of the structure of interest. If the structure of interest has an open rather than closed topology and if it adjoins additional structures along its natural perimeter, a method is specified for identifying the adjoining structures using a combination of logical operations and shape-changing operations applied to appropriately selected intermediate segmented volumes.

16 Claims, 13 Drawing Sheets

OTHER PUBLICATIONS

Dale, A.M., et al., "Cortical Surface–Based Analysis. I. Segmentation and Surface Reconstruction," 1999, NeuroImage 9:179–194.

Davatzikos, Ch., et al., "Using a Deformable Surface Model to Obtain a Shape Representation of the Cortex," 1996, IEEE Trans. Med. Imag. 15: 785–795.

Duta, N., et al., "Segmentation and Interpretation of MR Brain Images Using an Improved Knowledge–Based Active Shape Model," 1998, IEEE Trans. Med. Imaging. 17: 1049–1062.

Ge, Y., et al., "Accurate Localization of Cortical Convolutions in MR Brain Images," 1996, IEEE Trans. Med. Imaging 15:418–428.

Fischl, B., et al., "Cortical Surface–Based Analysis, II. Inflation, Flattening, and a Surface–Based Coordinate System," 1998, NeuroImage 9: 195–207.

Joshi, M., et al., "Brain Segmentation and the Generation of Cortical Surfaces," 1999, NeuroImage 9:461–476.

Manceauz–Demiau, A., et al., "A Probabilistic Ribbon Model for Shape Analysis of the Cerebral Sulci: Application to the Central Sulcus," 1998, J. Comput. Asst. Tomogr. 22: 962–971.

Nocera, L., et al., "Robust Partial Volume Tissue Classification of Cerebral MRI Scans," 1997, Med Imaging 22 Feb., K.M. Hanson, ed SPIE, Bellingham.

Teo, P.C., et al., "Creating Connected Representations of Cortical Gray Matter for Functional MRI Visualization," 1997, IEEE Transactions on Medical Imaging, 16: 852–863.

Xu, C., et al., "Reconstruction of the Central Layer of the Human Cerebral Cortex from MR Images," 1998, Proceedings of Medical Computing and Computer–Assisted Intervention, 481–488.

Xu, C., et al., Finding the Brain Cortex Using Fuzzy Segmentation, Isosurfaces, and Deformable Surface Models. In: The XVth Int. Conf. on Info. Proc. in Med. Img. (IPMI), Jun. 1997, pp. 399–404.

Thomas De Araujo Buck, et al., "3–D Segmentation of Medical Structures by Integration of Raycasting With Anatomic Knowledge," 1995, Computers & Graphics, vol. 19, No. 3, pp. 441–449.

Steven Dzik, et al., "Representing Surfaces with Voxels", 1992, Computers & Graphics, vol. 16, No. 3, pp. 295–301.

I. Gargantini, et al., "Reconstructing Multishell Solids from Voxel–Based Contours", Computer–Aided Design, 1994, vol. 26, No. 4, pp. 293–301.

* cited by examiner

MARGIN OF
NEOCORTEX

FIG. 2B
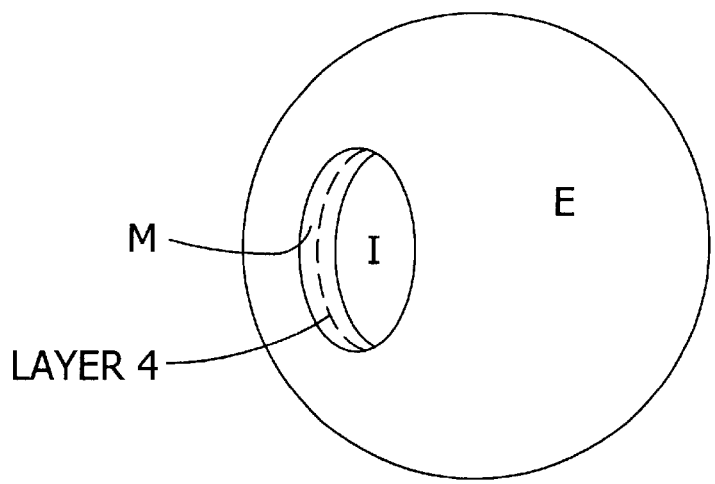
HOLLOW SPHERE WITH HOLE
FIG. 2D
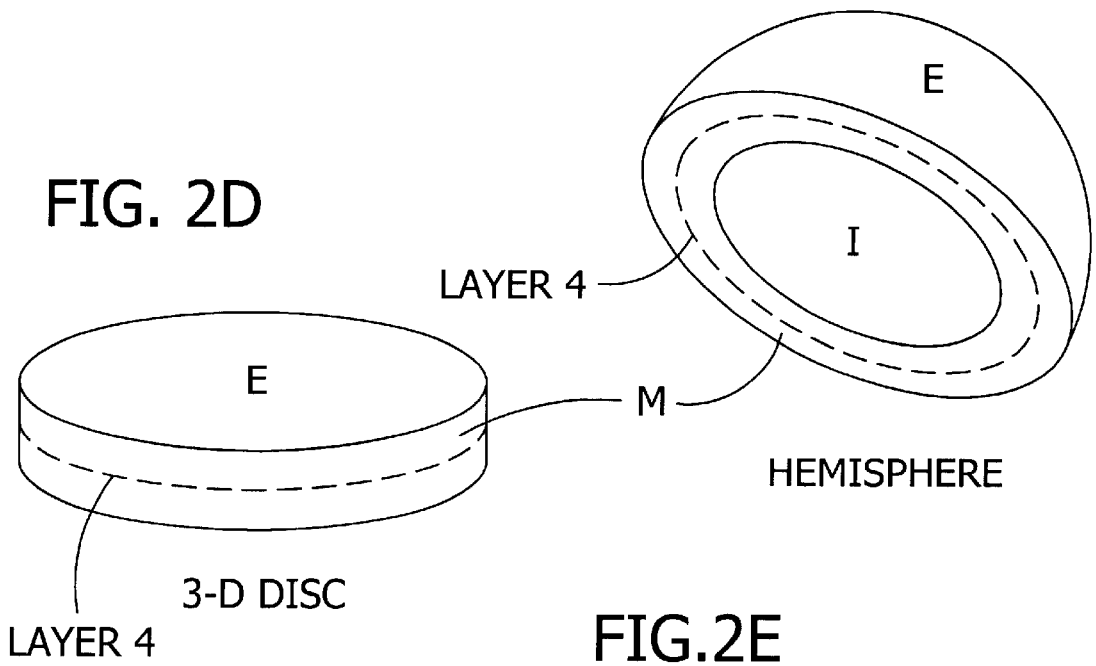
FIG2C
HEMISPHERE
3-D DISC
FIG. 2E
2-D DISC Sulcal Model
(Opposing slabs)

Gyral Model
(Single slab)

Material intensity histogram

Boundary intensity histogram

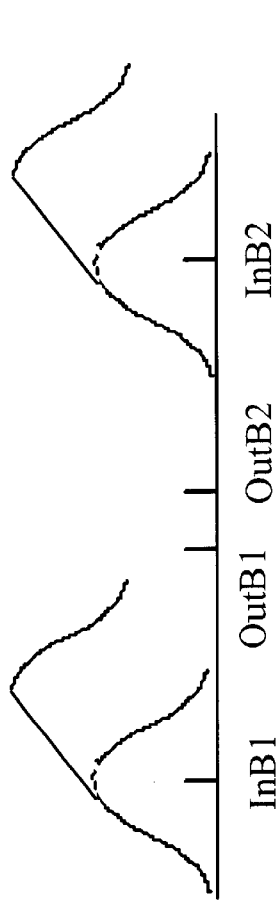
FIG. 9A
Evidence for inner border (using the boundary intensity transformation):
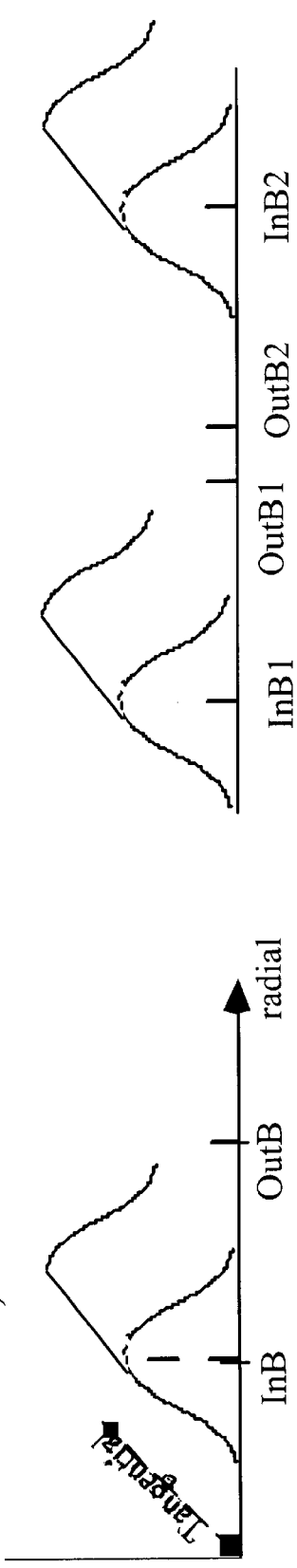
FIG. 9B
FIG. 10A
Evidence for outer border using the boundary intensity transformation):
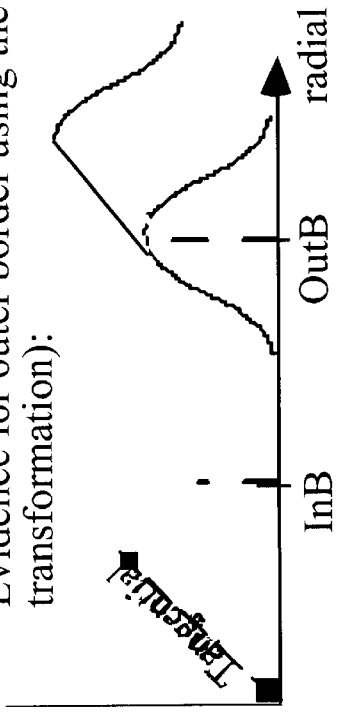
FIG. 10B

Flow Chart for Stage III
Probabilistic Volume Representations

SURE-FIT: AN AUTOMATED METHOD FOR MODELING THE SHAPE OF CEREBRAL CORTEX AND OTHER COMPLEX STRUCTURES USING CUSTOMIZED FILTERS AND TRANSFORMATIONS

This application claims priority to co-pending U.S. provisional patent application Ser. No. 60/101,242 filed Sep. 21, 1998, incorporated herein by reference.

BACKGROUND OF THE INVENTION

1. Field of the Invention

This invention describes a method for (i) generating probabilistic maps of the structure of cerebral cortex from neuroimaging data; (ii) using these maps to reconstruct explicit surface representations of the cerebral cortex; (iii) generating segmented representations of selected subcortical neuroanatomical structures and using these to exclude subcortical portions of the reconstructed surface; (iv) using a related set of strategies to characterize other aspects of cerebral structure such as the location of gyral and sulcal landmarks; and (v) extending the approach to the modeling of other structures besides cerebral cortex. The method is called SURE-FIT (SUrface REconstruction by Filtering and Image Transformations), because it relies heavily on a suite of filtering operations and transformations of image data to extract the information needed to reliably represent the shape of the cortical sheet.

2. Description of the Prior Art

Automatically identifying complex objects represented in 2-D or 3-D image data and determining their precise shape is an important but difficult problem in many areas of science, engineering, and technology. In many instances, the challenge is to reconstruct structures whose precise shape is not known, but which conform to strong constraints regarding their local geometric characteristics.

One problem of this type involves the mammalian cerebral cortex. The cerebral cortex is a thin sheet of tissue (gray matter) that is folded into a complex pattern of convolutions in humans and many other species. For a variety of purposes in both basic neuroscience research and clinical investigations, it is desirable to generate three-dimensional surface reconstructions that represent the shape of the cortical sheet. Relevant areas of application include experimental studies of the structure, function, and development of the cortex in humans and laboratory animals, plus clinical efforts to understand, diagnose, and treat neurological diseases, mental disorders, and injuries that involve the cerebral cortex.

The need for automated cortical surface reconstruction methods has grown rapidly with the advent of modern neuroimaging methods. Magnetic resonance imaging is particularly important, as it can noninvasively reveal the detailed pattern of cortical folds in individual subjects, and it also allows visualization of brain function on a scale comparable to that of cortical thickness.

A related problem involves the automated identification of the many subcortical nuclei and other neuroanatomical structures contained in the interior of the brain. These structures have a variety of complex shapes; some are heterogeneous in their material composition (of gray matter, white matter, and CSF); and some have common boundaries with several different structures. This makes it difficult to establish a consistent set of criteria for reliably segmenting any given structure. Most subcortical structures have a relatively consistent location in relation to standard neuroanatomical landmarks, which can be a valuable aid for segmentation.

This document makes no attempt to survey the extensive literature on segmentation and surface reconstruction in general, or even that relating to cerebral cortex and subcortical structures in particular. However, it is widely recognized that currently available computerized methods for reconstructing the shape of the cortex have major limitations in their accuracy and fidelity when dealing with the noisy images typically obtained with current neuroimaging methods. The SURE-FIT method offers a number of conceptual and practical advantages as an improved method for reconstructing and modeling the cerebral cortex and associated subcortical structures.

SUMMARY OF THE INVENTION

SURE-FIT is designed to operate on gray-scale volumetric imaging data as its primary input. Two common sources of relevant data are structural MRI and images of the cut face of the brain taken during histological sectioning.

SURE-FIT can produce a variety of volumetric (voxel-based) representations and surface representations that are useful individually or in various combinations. Surface representations include an initial surface representation that is constrained to lie within the inner and outer boundaries of the cortical sheet; representations of the inner, middle, and outer surfaces of the cortex; a representation of the radial axis along which these surfaces are linked, a representation of location within the cortical sheet in a three-dimensional coordinate system that respects the natural topology and structure of the cortex. Volume representations include both probabilistic (gray-scale) and deterministic (classified) maps of gray matter, subcortical white matter, and other structures of interest; plus vector-field measures of the location and orientation of the inner and outer boundaries of cortical gray matter and of the radial axis of the cortical sheet.

SURE-FIT emphasizes a combination of mathematical filters and transformations. that are designed to be near-optimal for extracting relevant structural information, based on known characteristics of the underlying anatomy and of the imaging process (i.e., priors in the Bayesian probabilistic sense). The use of filters and transformations per se for image segmentation and tissue classification is not new. The power of the SURE-FIT approach, as well as its novelty, derives from the particular choices of mathematical operations and their systematic application in order to efficiently utilize a large fraction of the relevant data contained in structural images. SURE-FIT also includes a family of shape-changing operations such as dilation, erosion, shifting, and sculpting that are applied to segmented (binary) volumes. When applied in appropriate combinations to appropriate intermediate volumes, these operations allow accurate segmentation of major subcortical structures.

In one form, the method of the invention is for reconstructing surfaces and analyzing surface and volume representations of the shape of an object corresponding to image data, in which the object has been modeled as one or more physically distinct compartments. The method comprises the following steps. Characteristics of a compartmental model are specified in terms of the material types contained in each distinct compartment as defined by the image data and in terms of the nature of compartmental boundaries as defined by the image data. An image model is specified that includes image intensity functions for each material type and for each boundary type based on the specified characteristics. Gradient functions are specified that characterize boundary types and some compartmental regions based on the specified characteristics. A set is generated of probabilistic volume representations of the location of different compartments and of the location and orientation of compartmental boundaries based on the image intensity functions and the gradient functions. A set of segmented (binary) volumes is generated that represent structures in the vicinity of said object, particularly those adjoining its perimeter, in order to identify and subsequently exclude said adjoining structures from the surface reconstruction.

In another form, the invention comprises a method for analyzing and visualizing the volumes of compartments enclosed by explicit surfaces comprising the following steps. For a topologically closed surface of the explicit surface, whether a voxel is inside, outside, or intersected by the closed surface is determined. For each voxel intersected by the surface, the fractional occupancy of the voxel by the region enclosed by the surface is determined. The total volume enclosed by the surface is determined by summing the fractional occupancy values, including those contained entirely within the surface. The total volume is visualized by scaling the voxel intensity according to the fractional occupancy.

In another form, the invention comprises a method for reconstructing the shape and identifying objects in 2-dimensional images, in which each object is modeled as one or more physically distinct compartments, using scalar or vector field 2-dimensional images as input data. The method comprises the following steps: delineating boundaries by contours; analyzing orientations with filter banks at an integral number of equally spaced orientations; and reconstructing contours surrounding segmented regions using automatic tracing algorithms.

In another form, the invention comprises a method for reconstructing surfaces and analyzing surface and volume representations of the shape of an organ, such as a brain, corresponding to image data. The method comprises the following steps: Conditioning and masking the image data including identifying white matter and restricting the volume of interest; Generating a segmented map of subcortical structures that adjoin the natural margins of cerebral neocortex or closely approach the cortical gray matter; Generating probabilistic structural maps within the masked image data and generating volumetric initial estimates of cortical gray matter; Generating and parameterizing a topologically representative initial surface representation from the structural maps and from the volumetric initial estimates; and Generating a full cortical model from the initial surface representation.

Other objects and features will be in part apparent and in part pointed out hereinafter.

BRIEF DESCRIPTION OF THE DRAWINGS

FIGS. 2A–2E illustrate the topology of the cerebral cortex.

FIG. 8A in its upper portion schematizes the overlapping distribution of curves typically encountered in structural MRI data for the three major materials in cerebral tissue, namely, white matter (WM), gray matter (GM), and cerebrospinal fluid (CSF). FIG. 8B in its lower portion schematizes voxels located along the inner boundary (InB), showing that the voxels should have an intensity distribution (i.e., a boundary intensity histogram) that is an approximately gaussian curve centered around a value intermediate between the gray matter and white matter peaks in the material intensity histogram.

FIGS. 9A and 9B illustrate a schematic output for Gyral and Sulcal models, respectively, of transforming the blurred intensity distribution (FIG. 6) with a gaussian centered on InB. As shown in FIG. 9, the spatial pattern after transforming to collect evidence for inner borders should reveal ridges along the trajectory of the inner boundary, subject to the uncertainties of noise.

FIGS. 10A and 10B illustrate the schematic output for Gyral and Sulcal models, respectively, of transforming the blurred intensity distribution (FIG. 6) with a gaussian centered on OutB1. As shown in FIG. 10, after transforming to collect evidence for outer borders, the spatial pattern should reveal strong ridges in gyral regions but weak ridges in Sulcal regions, because the intensity signal is inherently weaker where the CSF gap is narrow.

in FIG. 13A, a coronal slice through a structural MRI volume of a human brain; in FIG. 13B, a probabilistic representation of the inner boundary in the same coronal slice; in FIG. 13C, a probabilistic representation of the outer boundary in the same coronal slice; in FIG. 13D, a cutaway view of a segmentation of the cortical volume; in FIG. 13E, a cutaway view of a reconstructed cortical surface; in FIG. 13F, a lateral view of the cortical surface of the entire right hemisphere of a human brain, reconstructed using the SURE-FIT method; and in FIG. 13G, a medial view of the cortical surface of the same hemisphere, with non-cortical portions of the surface shown as 1302.

Corresponding reference characters indicate corresponding parts throughout the drawings.

BRIEF DESCRIPTION OF THE APPENDICES

Figure 1:
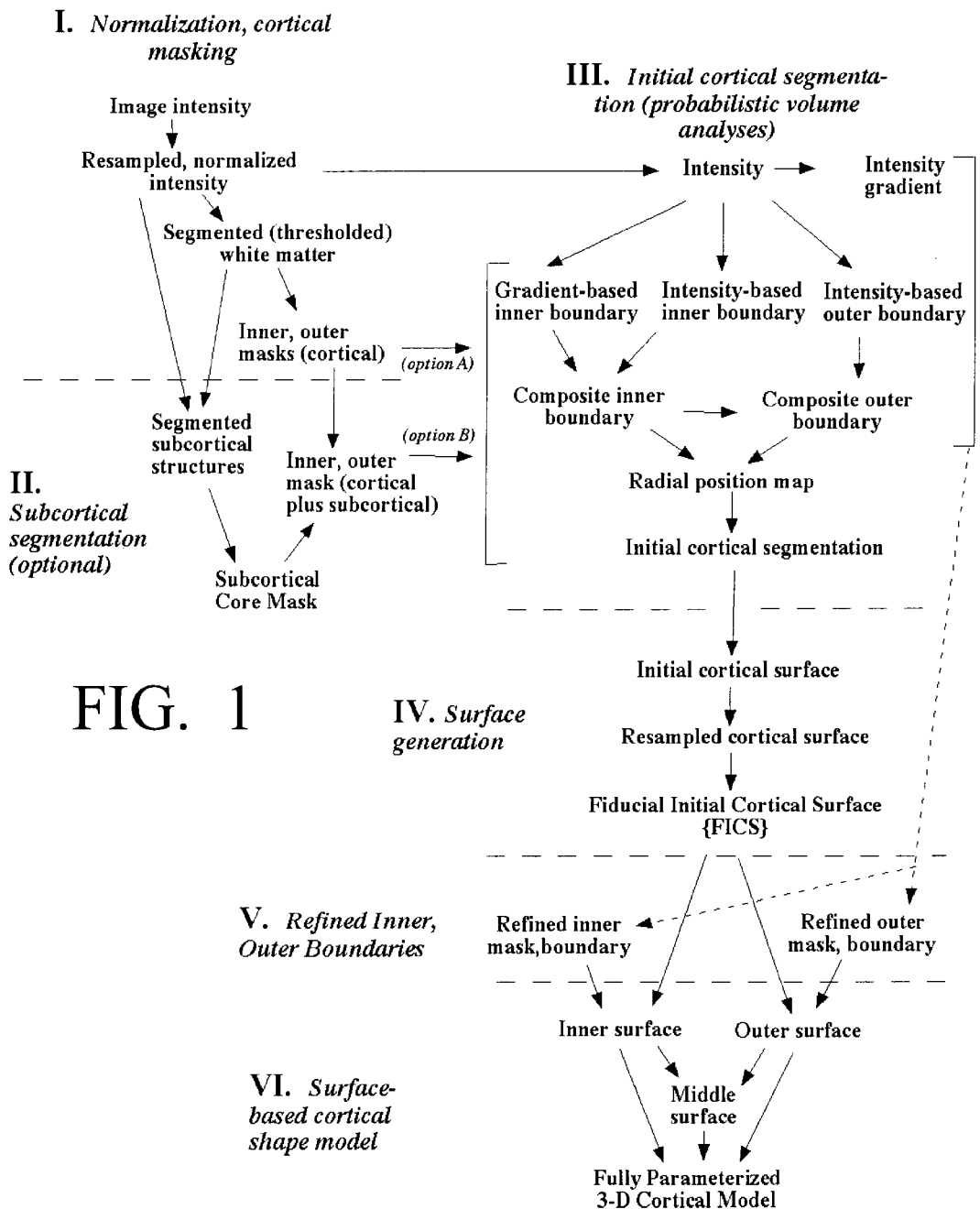
FIG. 1 is a schematic diagram illustrating the six major stages of the complex sequence of operations which constitute the reconstruction process according to the invention.

Appendix 1 describes modeling of the cortical structure.

Appendix 2 describes oriented three dimensional (3-D) filters.

Appendix 3 describes the processing steps and software implementation design.

Appendix 4 describes conventions, terms and library of operations.

DETAILED DESCRIPTION OF PREFERRED EMBODIMENTS

Contents

I. Introduction and Overview
  A. Statement of the problem.
  B. Design considerations and objectives.
II. General Analysis Strategies
  A. Appropriate sampling of volume of interest.
  B. Multi-stage and multi-stream analysis.
  C. Probabilistic and deterministic measures.
  D. Transformations.
  E. Probabilistic volume combinations.
  F. Filters and filter banks.
  G. Tensor field filter banks.
  H. Logical volume combinations.
  I. Morphological volume Operations.
III. Modeling of Structural and Imaging Properties
  A. Compartmental structural models.
    A.1. Material types.
    A.2. Boundary types and topology.
    A.3. Boundary orientation and curvature.
    A.4. Multi-boundary relationships.
    A.5. Structures with irregular geometry and restricted location.
  B. Modeling the imaging process.
    B.1. Image data and modeling priors.
    B.2. Intensity functions for material types.
    B.3. Gradient models.
IV. Volume-Based Boundary and Region Estimation
  A. Probabilistic mathematical operations on volume data.
    A.1. Transformation operations.
    A.2. Probabilistic volume combination operations.
    A.3. Sampling space and orientation.
    A.4. Filter geometry.
    A.5. Radially symmetric filters.
    A.6. Vector field filter banks.
    A.7. Tensor field filter banks.
    A.8. Orientation and gradient analysis operations.
    A.9. Peak Estimate Sharpening (Optional).
    A.10. Orientation Estimate Refining (Optional).
    A.11. Shape analysis and proximity operations.
    A.12. Histogram fitting operations.
  B. Generating probabilistic volume representations of material and boundary types.
    B.1. Renormalize and resample the raw intensity data.
    B.2. Intensity gradient determination.
    B.3. Intensity-based material estimation.
    B.4. Intensity-based boundary estimation.
    B.5. Oriented boundary estimation.
    B.6. Composite measures of boundary location and orientation.
    B.7. Composite measures of multi-boundary relationships such as slabs.
    B.8. Dual-boundary difference and gradient maps.
  C. Identification of irregular geometric structures using operations on segmented volumes.
    C.1. Thresholding and Logical Volume Combinations.
    C.2. Morphological Volume Operations.
    C.3. Shape-generating operations.
  D. Segmentation of slab-like structures.
    D.1. Setting a threshold for segmentation.
    D.2. Identification of subcortical boundary regions.
V. Surface Generation and Manipulation
  A. Mathematical operations on surface representations.
  B. Surface representations of compartmental boundaries; Initial Surface Generation.
VI. Shape Characterization and Geographic Segmentation of Surfaces and Volumes
  A. Generate refined volume representations of segmented volumes.
  B. Volumetric shape analyses.
VII. Outline of Major Steps
Stage I. Condition the Image Data, Identify White Matter, and Generate Masks for Inner and Outer Boundaries
  I.a. Provide Image data.
  I.b. Condition the image data.
  I.c. Determine a threshold level for white matter.
  I.d. Threshold the image volume.
Stage II (Optional). Generate a Composite Segmentation of Subcortical Structures That Cleanly Abuts the Natural Boundaries of Neocortex
  II.a. Determine an intensity threshold.
  II.b. Generate segmentations.
  II.c. Combine these volumes
  II.d. Use dilation, erosion, and volume combination operations.
Stage III. Generate Probabilistic Structural Maps of Cortical Gray Matter
  III.a. Assemble evidence for the inner cortical boundary.
  III.b. Assemble evidence for the outer cortical boundary.
  III.c. [optional] Assemble evidence for cortical gray matter.
  III.d. Generate a difference map between inner and outer cortical boundaries.
  III.e. Generate representations of major geographic landmarks.
Stage IV. Generate and Parameterize a Topologically Correct Initial Surface Representation
  IV.a. Segment the In-Out boundary.
  IV.b. Use patching and pasting operations.
  IV.c. Generate an initial cortical surface.
  IV.d. Resample the surface and generate a topologically closed surface.
Stage V (Optional). Generate Refined Estimates of the Inner and Outer Boundaries
  V.a. Generate a refined Inner Mask.
  V.b. Generate a refined inner boundary estimate.
  V.c. Generate a refined outer boundary estimate.
  V.d. Generate a refined In-Out Difference map.
Stage VI (Optional). Generate a Full Cortical Model That Includes Explicit Reconstructions of the Inner, Middle, and Outer Surfaces
  VI.a. Inner surface.
  VI.b. Outer surface.
  VI.c. Middle surface.
  VI.d. Fully parameterized representation of the cortical volume.
  VI.e. Tensor Field Analysis of 3-Dimensional Cortical Geometry.
Appendix 1. Modeling of Cortical Structure
  A. Anatomical characteristics (priors).
    A.1. Global characteristics.
    A.2. Local characteristics.

B. Image Model.
   B.1. Material composition and compartmental boundaries.
   B.2. Effects of image blur.
   B.3. Effects of intrinsic noise
C. A model of the middle cortical layer.
Appendix 2. Oriented 3-D Filters
   A. Choice of filter profiles.
   B. Choice of discrete orientations.
   C. Procedure for efficient computation.
Appendix 3. Processing Steps and Software Implementation Design
   A. A specific sequence of Processing Steps Suitable for Reconstructing Cerebral Cortex without concomitant subcortical segmentation.
      Stage I. Generating masks to restrict subsequent analyses.
         I.a. Normalizing and conditioning the image data.
         I.b. Determine parameter values. Determine inner and out masks.
         I.c. Determine inner and out masks
      Stage II (skip; Subcortical segmentation; see Section B, below)
      Stage III. Probabilistic representations of cortical structure.
         III.a. Inner Cortical Boundary
         III.b. Outer Cortical Boundary
         III.c. Combination measures.
      Stage IV. Generate initial surface.
         IVa. Initial segmentation
         IVb. Topologically correct segmentation.
         IVc. Initial surface generation.
   B. Cortical surface generation with concomitant subcortical segmentation.
      Stage I. Generating masks to restrict subsequent analyses.
      Stage II.a. Determine parameter values for subcortical segmentation.
      Stage II.b. Segment identified structures and regions.
      Stage II. Processing Steps
      Stage III. Probabilistic Representation of Cortical Structure
      Stage IV. Generate Initial Surface
         IV.a. Initial Segmentation
         IV.b. Topologically correct segmentation
         IV.c. Identification of Cortical and Non-Cortical Regions
         IV.d. Initial Surface Generation
      Stage V. Generate Refined Inner and Outer Marks and Boundaries
      Stage VI. Generate Full Cortical Surface Model and Characterize its Differential Geometry
         VI.a. Generate Full Cortical Surface Model.
         VI.b. Tensor Field Characterization of Cortical Differential Geometry
Appendix 4. Conventions, Terms, and Library of Operations
   1. Library of voxel transformation operations
   2. Combination operations on multiple volumes:
   3. Combinations of Scalar Volumes
   4. Combine Vectro Volumes
   5. Filter profiles and convolution-related operations.
      5.1. Low pass filters.
      5.2 Symmetric filters
      5.3. Convolution equivalent by Modulate-LowPass-Demodulate
      5.4. Downsampling of filter array.
      5.5. Shape analysis and proximity operations.
         5.5.1. NearScalar.
         5.5.2. Near2Planes.
         5.5.3. Near1at1Plane.
         5.5.4. NearInAndOut.
         5.5.5. Additional shape analysis routines.

I. INTRODUCTION AND OVERVIEW

This invention involves a novel method for identifying complex structures contained in image data, estimating their shapes, and visualizing these shapes with a combination of probabilistic volume representations, thresholded volume representations, and explicit surface representations. The method is called SURE-FIT (SUrface REconstruction by Filtering and Image Transformations), because it relies on an extensive suite of filtering operations and transformations of image data to extract and represent the relevant information. In its initial development, the method has been targeted to the. modeling of mammalian cerebral cortex. In particular, the current design and implementation of SURE-FIT focuses on (i) generating probabilistic maps of the structure of cerebral cortex from neuroimaging data; (ii) using these maps to reconstruct accurate surface representations of the cerebral cortex; (iii) generating models of selected subcortical neuroanatomical structures and using these to exclude subcortical portions of the reconstructed surface; and (iv) using a related set of strategies to characterize other aspects of cerebral structure such as the location of individual sulci and gyri, plus other geographic landmarks. One preferred software implementation design for cortical segmentation is described in Appendix 3, Section A (and Appendix 4). A preferred software implementation design that can be used for both cortical and subcortical segmentation is described in Appendix 3, Section B (and Appendix 4).

In its general formulation, the SURE-FIT method can be applied to a wide variety of problems in science and technology. The range of relevant fields includes but is not limited to biological and biomedical imaging, neuroscience, surgery, radiology, botany, zoology, paleontology, archaeology, geography, astronomy, and cartography. The general requirement for reconstructing the shape of complex structures is that the structure(s) to be modeled can be adequately described and distinguished from surrounding portions of the image by an appropriate combination of shape attributes, featural characteristics, and positional constraints relative to nearby structures. A non-exhaustive list of explicit shape characteristics that can be analyzed by the library of shape filters and operations include thickness, curvature, flatness, elongatedness, foldedness, bumpiness, and dentedness. A non-exhaustive list of featural characteristics include intensity values obtained from one or more imaging modalities, color, texture (e.g., texture energy from oriented filter banks), and their spatial gradients. Many problems involving identification of slab-like or sheet-like structures (e.g., skin) can be analyzed with relatively modest modifications of the of the sequence of operations summarized in FIG. 1. Additional shapes that can be modeled include convex surfaces (e.g., organs like the heart), a mixture of locally convex and concave surfaces, or a variety of tree-like structures, both microscopic and macroscopic. Thus, the range of relevant fields includes neuroscience, biological and biomedical imaging, botany, zoology, geography, and cartography.

A. Statement of the Problem

Automatically identifying complex objects represented in 2-dimensional images or 3-dimensional image volumes and determining their precise shape is an important problem in many areas of science, engineering, and technology. In many instances, the challenge is to reconstruct structures whose precise shape is not known, but which conform to strong constraints regarding their local geometric characteristics. The problem can be particularly difficult to solve if the structure of interest is complex in shape, if it differs only subtly from neighboring structures, or if the image data are noisy and/or blurred.

One problem of this type involves the mammalian cerebral cortex. The cerebral cortex is a thin sheet of tissue (gray matter) that is folded into a complex pattern of convolutions in humans and many other species. For a variety of purposes in both basic neuroscience research and clinical investigations, it is desirable to generate three-dimensional surface reconstructions that represent the shape of the cortical sheet. Relevant areas of application include experimental studies of the structure, function, and development of the cortex in humans and laboratory animals, plus clinical efforts to understand, diagnose, and treat neurological diseases, psychiatric or other mental disorders, and tumors or injuries that involve the cerebral cortex.

The need for automated cortical surface reconstruction methods has grown rapidly with the advent of modern neuroimaging methods. Magnetic resonance imaging is particularly important, as it can noninvasively reveal the detailed pattern of cortical folds in individual subjects, and it also allows visualization of brain function on a scale comparable to that of cortical thickness.

Currently available computerized methods for reconstructing the shape of the cortex have major limitations in their accuracy and fidelity when dealing with the noisy images typically obtained with current neuroimaging methods. They also are limited in their ability to automatically exclude subcortical gray matter regions from the reconstructed surface. The SURE-FIT method offers a number of conceptual and practical advantages as an improved method for reconstructing and modeling the cerebral cortex and other neuroanatomical structures.

B. Design Considerations and Objectives

SURE-FIT is designed to operate on volumetric (3-D) imaging data as its primary input, but it can also be applied to 2-D images. In the arena of brain imaging, two common sources of relevant data are structural MRI and images of the cut face of the brain taken during histological sectioning. As its outputs, SURE-FIT can produce a variety of volumetric (voxel-based) representations and surface representations that provide a rich description of the location and shape of the structure(s) being modeled.

In a volume representation, image data are sampled at regular intervals along each spatial dimension. A scalar volume has a single data value at each location (voxel); a vector volume has multiple data values (vectors) at each voxel. Volume data can be segmented into binary (yes/no) values, but an important aspect of the SURE-FIT strategy is to postpone the segmentation step until the data quality are high enough that the probability of errors is minimal.

Explicit surface representations are particularly suitable for representing boundaries compactly and with high precision. Surfaces initially reconstructed from a segmented volume can generally be refined using the probabilistic vector and/or scalar data.

SURE-FIT generates output representations in a sequence of steps that variously involve mathematical filters, image transformations, and algebraic volume combinations. Each step is designed to be well suited for extracting, refining, and/or representing a particular aspect of structural information, based on known characteristics of the underlying anatomy and of the imaging process. These features and relationships constitute priors in the Bayesian probabilistic sense. Filters are selected from an overall set capable of efficient extraction of many types of information about local shape characteristics in image data.

The use of filters and transformations per se for image segmentation and tissue classification is not new. The power of the SURE-FIT approach, as well as its novelty, derives from the principled, model-based choice of mathematical operations and their systematic application in order to efficiently utilize a large fraction of the relevant data contained in structural images.

If the shape of a structure of interest cannot be modeled with sufficient fidelity using a strictly probabilistic approach, an alternative strategy is to use a combination of logical operations and morphological shape-changing operations applied to segmented (binary) volumes. This strategy can capitalize on constraints relating to the location of a structure within the overall volume or to its location relative to other segmented structures.

II. GENERAL ANALYSIS STRATEGIES

A. Appropriate Sampling of the Volume of Interest

The image data should be resampled to optimize trade-offs between spatial resolution, signal-to-noise, and computational efficiency. This may entail using a sampling density higher than the nominal spatial resolution of the imaging modality. Analysis involving computationally intensive steps should be concentrated on a volume of interest in the general vicinity of the structure to be modeled using appropriately selected masking volumes.

B. Multi-Stage and Multi-Stream Analysis

The primary measures on which the analysis is based are the image intensity and the intensity gradient. Evidence is collected and combined in stages, using a variety of transformations and filtering operations, and generating numerous intermediate image volumes.

C. Probabilistic and Deterministic Measures

The outputs of many operations are continuous-valued measures at each voxel, expressed as scalar fields or vector fields. They are not strict probability measures, but they are designed so that the magnitude increases monotonically with confidence in the particular feature or correlation of features being estimated. Deterministic measures are best made only when the representations are of high enough quality that few if any errors are made by thresholding and binarizing the data. Otherwise, alternative steps need to be introduced to correct errors that have accrued. Mathematical operations include a library of transformations (operations on single voxels), filters, and combination operations on multiple volumes.

D. Transformations

Transformations are matched to the known or estimated characteristics of the image intensity distribution and its relation to different materials and structures that are imaged. They yield probabilistic representations of tissue classes or of explicit boundaries between tissue classes.

E. Probabilistic Volume Combinations

Different types of intermediate evidence represented throughout the volume can be combined using arithmetic or algebraic operations applied to the data in corresponding voxels in two or more image volumes. Such operations can be carried out so as to enhance the confidence regarding the presence or absence of a particular structure or boundary. The choice of operation is based on a principled strategy that reflects important relationships and characteristics of the underlying anatomical structures.

F. Filters and Filter Banks

To analyze and extract information about cortical structure, SURE-FIT uses a variety of filters, some of which have distinctive characteristics relative to filters commonly used in image processing. Filter dimensions and characteristics are matched to the known or estimated dimensions of the structures of interest and to the known or estimated effects of noise and blurring of the image data.

G. Tensor Field Filter Banks

Filters that contain vectors at each filter voxel can be applied to volumes that are themselves vector fields, which involves tensor operations as the convolution is performed. Tensor field filter banks are very useful for extracting information about geometric structure in a volumetric vector field representation.

H. Logical Volume Combinations

Different types of intermediate evidence represented throughout the volume can be combined using logical (binary) operations applied to the data in corresponding voxels in two or more image volumes. Such operations can be carried out to reflect deterministic geometric relationships (e.g., knowledge that a particular structure is located within a particular region).

I. Morphological Volume Operations

A binary (segmented) volume can be modified by standard morphological operations that systematically change the shape of the segmented region (e.g., expanding, shrinking, shifting, or otherwise systematically altering its shape). These operations can reflect an additional set of geometric relationships (e.g., knowledge that a given structure is constrained to be within a specified distance of another structure or is constrained to be in a particular direction relative to that structure).

III. MODELING OF STRUCTURAL AND IMAGING PROPERTIES

A. Compartmental Structural Models

SURE-FIT is designed for reconstructing structures that can be modeled as a set of physically distinct compartments separated by well-defined boundaries. Characterization of a model involves specification of (i) the type of material contained each compartment, plus any relevant polarity or anisotropic characteristics the material may have; (ii) the local shape characteristics of each boundary, as well as its overall topology; and (iii) restrictions regarding where different compartments can occur within the overall image volume.

The strategy for developing an appropriate model is stated below, first in general terms for arbitrary structures of interest. This is followed at each step by comments specific to cerebral cortex (inset text), including key facts and relationships that can be important in the reconstruction process and are illustrative of the type of specifications needed when formulating other models. Appendix 1 spells out the model for cerebral cortex in greater detail and schematically illustrates many of the key concepts.

The information needed to characterize a model can be obtained in a variety of ways. A preferred strategy is to use the characteristics of a template model that has been previously reconstructed from a different exemplar of the same structure (e.g., for cerebral cortex, a different individual hemisphere from the same species).

A.1. Material Types

Specify the major types of material (e.g., biological tissue types) in and near the structure of interest.

The primary materials relevant to modeling cerebral cortex are white matter, cerebrospinal fluid, and gray matter. Gray matter includes both cortical and subcortical components, which are often similar in imaging characteristics. Depending on the image data and the analysis objectives, it may also be important to specify other nearby materials (e.g., blood vessels, fatty tissue, bone, dura mater).

Specify any relevant polarities or anisotropies.

Cortical gray matter has a natural anisotropy related to structural differences along radial versus tangential axes. It also has a natural polarity that distinguishes inward from outward along the radial axis. White matter has a natural anisotropy related to local biases in the orientation of its constituent axons, which can be visualized by techniques such as diffusion tensor imaging.

Specify any restrictions on where each material type occurs within the overall volume.

The inner and outer boundaries of cerebral cortex are restricted to shell-like subvolumes. Suitable subvolumes can be generated by initially determining the approximate extent of subcortical white matter, and then generating surrounding shells of appropriate thickness and average distance from the estimated white matter boundary. Restricting analyses to these shells can alleviate the overall computational burden. These shells can be further constrained by excluding subcortical structures that have been modeled using strategies outlined in Section III.A.5 and detailed in other sections.

A.2. Boundary Types and Topology

Specify the types of boundaries contained in the structure of interest, in terms of the identity and polarity of materials on either side of the interface between compartments.

The cortical sheet has an asymmetric inner boundary formed by the interface between gray matter and white matter. The outer boundary (the pia mater) adjoins CSF in gyral regions, forming an asymmetric boundary between gray matter and CSF. In sulcal regions the cortex is folded symmetrically so that two oppositely polarized sheets abut one another along their outer boundaries. The CSF gap between outer boundaries is discernible in some regions, but in other regions no gap is discernible and the existence of the boundary can only be inferred from higher level analysis of nearby features. (See FIGS. 2, 3 for illustrations.)

In addition, specify the surface topology (e.g., closed, open, or toroidal surfaces) of each boundary.

Both the inner and outer boundaries of cerebral cortex are topologically equivalent to a disk (see FIG. 1).

A.3. Boundary Orientation and Curvature

For each boundary type, specify its local shape characteristics, including whether portions of the boundary tend to be locally flat, folded along a single axis, or curved along two axes (i.e., bulging or dimpled). If feasible, base these specifications on a quantitative assessment of a histogram distribution of the two principal curvatures and the surface normal estimated for the volume as a whole or for different subvolumes.

> Both the inner and outer boundaries of the cortex are dominated by relatively flat regions (both principal curvatures low), interspersed by regions of folding along one axis (one principal curvature high, the other low). Occasional regions of modest bulging (both principal curvatures large and positive) or indentation (both principal curvatures large and negative) also occur. There are pronounced regional biases in the distribution of boundary orientations in lissencephalic brains, but less so in gyrencephalic species such as humans.

A.4. Multi-Boundary Relationships

For regions characterized by nearby boundaries having a systematic geometric relationship to one another, specify the boundary types, the relative angle between boundaries, and the separation or periodicity of boundaries. In particular, for slab-like regions, specify the slab thickness and boundary types on opposite sides of the slab.

> Cerebral neocortex is a slab-like structure throughout. Its thickness (the separation between inner and outer boundaries) is relatively tightly distributed about a mean value that is characteristic for each species. Along outward (gyral) folds, the inner boundary is sharply creased and the outer boundary is gently folded. Along inward (sulcal) folds sharp creasing of the outer boundary is correlated with gentle folding of the inner boundary.

A.5 Structures with Irregular Geometry and Restricted Location

For structures having an irregular geometry and/or heterogeneous material composition that is not readily modeled by a small number of shape descriptors, specify a collection of size, shape, and positional constraints that can be used with a combination of thresholding and shape-changing operations (including dilation, erosion, smearing, and sculpting) to achieve a reliable segmentation.

> The cerebral neocortex is topologically equivalent to a disk whose perimeter adjoins a number of neuroanatomical structures having different imaging characteristics and which are amenable to modeling by the strategy just described. These include white matter structures (e.g., the corpus callosum), subcortical nuclei (e.g., the amygdala and the nucleus basalis), and other cortical structures (the hippocampus and olfactory cortex). In addition, in some places the cortical sheet lies in close proximity to underlying non-white-matter structures, including the lateral ventricle and the basal ganglia.

B. Modeling the Imaging Process

B.1. Image Data and Modeling Priors

The image data may be obtained as a scalar (gray-scale) output for each location in the image volume, or as a multi-dimensional output (e.g., a color image, or the outputs of multiple MRI scans with different pulse sequences) that can be treated as a vector-field image volume. The intensity value at each voxel reflects not only the particular material type at each location of the structure being imaged but also the nature of the imaging process. Key aspects of the imaging process include (i) the idealized imaging characteristics of each material type; (ii) inhomogeneities in material composition of the voxel relative to that of the idealized material type; (iii) effects of intrinsic noise in the imaging method; (iv) spatial blurring near boundaries with other materials; and (v) regional biases or nonuniformities in signal characteristics associated with the imaging method.

B.2. Intensity Functions for Material Types

Model each material type, using a material intensity function that adequately fits the observed image data. For scalar image data, specify a material intensity function, such as a 1-dimensional gaussian, that approximates the observed intensity histogram for regions containing that material. For vector image data, rotate the vector axes (e.g., by principal components analysis) to maximize the discriminability of major material classes using the transformed primary dimension. Then specify a material intensity function, such as a multi-dimensional gaussian, that approximates the observed multi-dimensional histogram for regions containing that material.

> For cortex, specify material intensity functions for white matter, gray matter, CSF, and fatty tissue by fitting an appropriate model (e.g., a gaussian distribution) to the relevant peak in the intensity histogram.

Image blur function. Specify the degree of image blur along each image dimension, based on the observed image data.

> For cortex, spatial blur can be estimated from the observed intensity pattern in regions containing anatomically sharp boundaries oriented orthogonal to the image plane.

Intensity functions for boundary types. Specify a boundary intensity function that approximates the observed intensity histogram for voxels intersected by each boundary type.

> Model the inner cortical boundary using a distribution (e.g., a gaussian, or a pair of one-sided gaussians) whose peak is approximately midway between the peaks of the white matter and gray matter intensity models. Model the outer cortical boundary using a gaussian or similar distribution intermediate between those for the CSF and gray matter intensity models. Base the standard deviation(s) of both boundary models on the intrinsic noise, spatial blur, and regional heterogeneity in the observed image data.

B.3. Gradient Models

Specify boundary gradient functions that reflect the observed magnitude and polarity of the image intensity gradient for each boundary type. For the inner cortical boundary, the gradient is generally large and directed towards white matter. In gyral regions, the gradient has a local maximum along the outer boundary, whereas in sulci the gradient may be at or near a local minimum along the outer boundary. For compartments whose thickness substantially exceeds the extent of blurring along boundaries, specify whether there is a systematic gradient in any particular direction for the material intensity function. For cerebral white matter and CSF the gradient of 1-dimensional intensity data is shallow except for fluctuations associated with noise and blurring along boundaries.

IV. VOLUME-BASED BOUNDARY AND REGION ESTIMATION

A. Probabilistic Mathematical Operations on Volume Data

The specific characteristics of any given structural model and its associated imaging model are used to design an appropriate sequence of transformations, volume combination operations, filtering operations, and shape analysis operations. The particular operations are selected and customized from a larger general set, including but not restricted to the those outlined below. The sequence in which they are applied should be customized to maximize the accuracy and fidelity of the reconstruction given the nature of the image data and the analysis objectives.

A.1. Transformation Operations

These include a general set of voxel transformation operations that apply algebraic transformations to the data at individual voxels within a volume. Operations include but are not restricted to normalization (linear and nonlinear), intensity transformation (e.g., 1-dimensional or multi-dimensional gaussian), rectification, and thresholding (i.e., creating a binary volume whose high values are assigned to voxel intensities above a particular threshold, below a particular threshold, or in between two threshold values).

A.2. Probabilistic Volume Combination Operations

These include a general set of volume combination operations that apply algebraic operations to the data at corresponding voxels in two or more image volumes. These operations can be applied to scalar volumes, vector volumes, or a combination thereof. The operations include but are not restricted to addition, subtraction, multiplication, division, rectification, taking the square root, taking the sum of the squares, taking the dot product, determining the average vector orientation or direction, and various combinations thereof.

A.3. Sampling Space and Orientation

An appropriate voxel spacing and an appropriate spacing of filter orientations needs to be selected for the analysis, given considerations of spatial resolution, signal-to-noise, computational constraints, and analysis objectives. Select the filter bank orientations based on Cartesian geometry (3 orientations, 6 directions the faces orthogonal to a cube), dodecahedral geometry (6 orientations, 12 directions orthogonal to the faces of a dodecahedron), or icosohedral geometry (10 orientations, 20 directions orthogonal to the faces of an icosohedron). A dodecahedral filter bank is advantageous because the 6 values generated at each voxel for symmetric filters (12 values for asymmetric filters), provides a minimal set for characterizing the local spatial features (first and second moments) of the data set.

A.4. Filter Geometry

This includes a general set of filter types and filter banks. In general, the filters are designed to extract information about gradients in the image data (related to the dipole moment) and about second derivatives (i.e., curvature characteristics, related to quadrupole moments). Each filter type is distinguished by (i) the shape of the filter profile (used to test for different shape characteristics in the image), (ii) whether the filter elements are scalar values or vectors and (iii) the location of the filter origin relative to the filter profile (allowing evidence to be collected about shape characteristics at specified distances and directions from the filter origin).

A.5. Radially Symmetric Filters

Low-pass filters blur the image using separable filters applied along each dimension. Laplacian filters take the difference between an image and a blurred version of the image.

A.6. Vector Field Filter Banks

Vector field filter banks have scalar values at each filter voxel and generate a vector field output when applied as a filter bank. Filter profile shapes include, but are not restricted to asymmetric and symmetric oriented filters such as sine-modulated and cosine-modulated gaussians (e.g., steerable filters; see Appendix 2), planar ellipsoidal filters, and needle-like ellipsoids.

A.7. Tensor Field Filter Banks

Tensor field filter banks contain vectors at each filter voxel and can be applied to volumes that are themselves vector fields. Filter profile shapes include, but are not restricted to, cylindrical, hemi-cylindrical, spherical, hemispherical, conical, and saddle-shaped filter profiles. The vector at each filter should be pointed along the axis of the local surface normal of the shape being tested for (or in a specified orientation relative to that normal). The filter origin should be placed at a specified location, such as the locus of convergence of the vector array, and not necessarily in the geometric center of the profile.

A.8. Orientation and Gradient Analysis Operations

An efficient filtering method is needed in order to estimate (i) the location, orientation, and polarity of gradients (e.g., edges) in an image and (ii) the location and orientation of quasi-planar peaks or dips in an image volume. One method that meets this need is to apply quadrature-pair banks of asymmetric filters (e.g., sine-modulated gaussians) and symmetric filters (e.g, cosine-modulated gaussians) to an image volume (or, to reduce DC bias effects, to the Laplacian of the image volume). The filter-bank outputs are obtained by a standard method of convolving the intensity data with the appropriately oriented filters, or by a computationally more efficient process. A preferred implementation involves (i) modulation of the total image with appropriately oriented sine and cosine patterns; (ii) low-pass filtering of the modulated image; and (iii) demodulation with an appropriate sine- and cosine-modulated combination of these filtered images. Multiply the sine filter bank outputs with a matrix whose coefficients are based on odd moments and which yields the magnitude and direction of the intensity gradient. Multiply the cosine filter bank outputs with a matrix whose coefficients are based on even moments; use the eigenvalues and eigenvectors of the resultant matrix to generate separate estimates of the magnitude and orientation of local peaks and of local dips in the image volume.

A.9. Peak Estimate Sharpening (Optional)

Sharpen the estimates of where peaks and dips are located using the cosine power measures divided by the sine power measure plus a constant that is adjusted according to a trade-off between the incidence of false positives and the sharpness of localization.

A.10. Orientation Estimate Refining (Optional)

Refine the orientation estimate by calculating the vector average across neighboring voxels of the sine- based gradient vector and the cosine-based orientation vector, (flipped as needed to insure a positive dot product with the largest vector).

A.11. Shape Analysis and Proximity Operations

These include filtering method for collecting evidence relating to the likelihood a voxel is (i) near but not within particular materials, or (ii) near boundaries of a particular boundary type, orientation, and shape (e.g, flat, inwardly or outwardly folded, indented) and a particular distance away. For filters with displaced origins, a useful operation is to rectify the outputs of individual filter orientations before combining results across orientations. This avoids unwanted cancellation between positive evidence that a feature is present at one nearby location and evidence that the same feature is demonstrably absent at a different nearby location. For filters with vector values, a useful operation is to take the dot product of the filter vector with the data vector. This tests for consistency with orientation or direction cues as well as intensity cues for shape.

A.12. Histogram Fitting Operations

These include processes that estimate the peaks in an appropriately binned 1-dimensional or multi-dimensional histogram and arrange these peaks in order of increasing distance from the histogram origin. For the specified number of peaks within specified intensity ranges, the best-fitting gaussian or other function is determined using least-squares fitting or other fitting procedure.

B. Generating Probabilistic Volume Representations of Material and Boundary Types The set of operations and sequence of processing steps outlined below are adequate to allow accurate modeling of human cerebral cortex from image data of the type typically obtained with current structural MRI. Depending on issues of resolution, signal-to-noise, region of interest, and analysis objectives, various of the individual steps can be bypassed, or additional steps along the same general lines can be introduced to extract additional information.

B.1. Renormalize and Resample the Raw Intensity Data

Prior to the main analysis, pre-process the image data if needed to remove regional biases and adjust the range to emphasize the materials of interest. Use an existing renormalization method or a method that includes some or all of the following steps. Determine the intensity histogram peaks for different materials in the entire volume. Reduce regional variations in peak values by a normalization process (such as piecewise linear interpolation applied to overlapping subvolumes). Use an automatic or interactive histogram-fitting method to determine the peaks and standard deviations for relevant material types and to establish which subvolumes contain an adequate representation of the relevant material types.

B.2. Intensity Gradient Determination

Determine the gradient (including its direction and magnitude) of the intensity data.

B.3. Intensity-based Material Estimation

For each material type, transform the image data using the appropriate material intensity function, thereby generating an initial probabilistic map of where each material is located in the image volume.

For the cortex, generate an initial estimate for the distribution of white matter and gray matter by transforming the intensity image with the material intensity functions for white matter and gray matter.

B.4. Intensity-based Boundary Estimation

For each boundary type, transform the intensity image using the corresponding boundary intensity function, thereby generating an initial probabilistic map of where that boundary is located.

For the cortex, generate separate intensity-based estimates for the inner boundary and the outer boundary.

B.5. Oriented Boundary Estimation

Generate a vector field map of the location and orientation of quasi-planar peaks in the initial intensity-based estimates of boundary location using orientation filters whose dimensions are matched to the estimated image blur and a method for estimating location and orientation from the outputs of the filter bank. For the cortex, use this approach to generate separate vector field representations of both the inner boundary and the outer boundary within an appropriately masked subvolume.

B.6. Composite Measures of Boundary Location and Orientation

Obtain composite estimates of boundary location and orientation by combining each oriented boundary estimate with appropriate additional measures regarding material composition and gradient direction.

For cortex, generate a composite measure of the inner cortical boundary by testing for the concurrent presence within an appropriately masked subvolume of (i) an intensity-based inner boundary of a particular orientation, (ii) white matter on one side of that boundary, (based on the magnitude and direction of the white matter gradient), (iii) cortical gray matter on the other side (based on the magnitude and direction of the gray matter gradient), and (optionally) (iv) an intensity gradient of appropriate direction and magnitude in the vicinity.

Generate a composite measure of the outer cortical boundary within an appropriately masked subvolume by testing for the presence of (i) an outer intensity-based boundary of a given orientation plus (ii) an inner boundary of an appropriate orientation and an appropriate distance away; and/or (iii) a pair of inner boundaries on opposite sides, at an appropriate orientation, and an appropriate distance away.

B.7. Composite Measures of Multi-boundary Relationships Such as Slabs

Generate a composite measure of slabs and other multi-boundary regions by testing for the concurrent presence of nearby boundaries of the appropriate type, appropriate shape, and with the appropriate angles and spacing between one another. For slab-like regions, test for the presence of nearby boundaries that are parallel to one another, of the appropriate type, and with the appropriate material in between.

For the cortex, optionally generate a composite measure for cortical gray matter by combining the evidence for (i) gray matter based on intensity measures; (ii) a nearby inner border (based on its composite measure); and (iii) a nearby outer border (based on its composite measure) that is parallel to the inner border and at an appropriate spacing.

B.8. Dual-boundary Difference and Gradient Maps

For structures containing slab-like regions (or other asymmetric dual-boundary compartments), generate a difference map between the composite measures of the two boundaries.

For the cortex, generate an Inner-Outer difference map between the composite measures of its inner and outer boundaries that is minimal when the evidence strongly favors the outer boundary and maximal when the evidence strongly favors the inner boundary or the subjacent cerebral white matter, optionally applying this steps specifically to portions of the volume masked as described in Section IV.C.

Determine the gradient of this boundary difference map, for use as a volumetric representation of important shape characteristics.

For the cortex, determine the gradient of the boundary difference map. Use the gradient normal as a representation of the radial axis of the cortical sheet.

C. Identification of Irregular Geometric Structures Using Operations on Segmented Volumes For structures having an irregular geometry that is not readily modeled using the probabilistic strategies outlined in Section IV.B, they can instead be segmented by applying a collection of deterministic operations to appropriately thresholded volumes and to appropriate intermediate volumes. The location and specific neuroanatomical and imaging characteristics of each structure are used to design an appropriate sequence of thresholding, logical volume combinations, and morphological shape-changing operations. The particular operations are selected and customized from a larger general set, including but not restricted to the those outlined below. The sequence in which they are applied should be customized to maximize the accuracy and fidelity of the segmentation given the nature of the image data and the analysis objectives.

For segmentation of subcortical structures that are used in conjunction with cortical segmentation, a preferred strategy is to identify a core region that includes all subcortical regions immediately adjoining the natural perimeter of cerebral neocortex, but without encroaching into neocortical gray matter. Suitable structures include, but are not restricted to: the lateral ventricle; the basal ganglia; the thalamus; the brainstem; the hippocampus and amygdala; cerebral white matter; the corpus callosum; large blood vessels coursing in and near the cerebrum; and structures within the orbit of the eye.

C.1. Thresholding and Logical Volume Combinations

Thresholding of the intensity volume can be used to represent particular material types. Logical volume combinations include processes that combine multiple segmented volumes by applying logical operators (e.g., And, And-Not, OR) to each voxel, to yield a single output volume.

C.2. Morphological Volume Operations

These include modification of a segmented volume by standard morphological operations of dilation (adding successive layers of voxels to the segmented volume, thereby expanding a region along its boundary), erosion (removing successive layers of voxels, thereby shrinking the size of a region), flood-filling (to identify all voxels in contiguity with a seed voxel, thereby segmenting only topologically contiguous regions), and hole-filling (adding to the segmentation all voxels that are completely surrounded by the segmented volume). Combined dilation and erosion can also be used to eliminate internal holes. In addition, a segmented volume can be modified by smearing (shifting it by a specified distance along a specified axis, with or without preservation of the original segmented region), for example, in order to establish a barrier between regions. A segmented volume can also be modified by the iterative dilation/combination operation of sculpting, in which each dilation step creates a shell that is combined with another volume by a logical volume combination before being added to the previous step of the partially sculpted volume, thereby expanding a region selectively in relation to the shape of another segmented volume.

C.3. Shape-generating Operations

A binary volume can be created by specifying a particular geometric shape (sphere, ellipsoid, rectangular solid) and particular dimensions and center location, or by importing a pre-existing segmented structure having a desired shape and location from a different data set (e.g., an atlas generated from a different hemisphere).

D. Segmentation of Slab-like Structures

For slab-like structures for which a probabilistic difference map between the two boundaries has been generated (Section IV.B.8), threshold the difference map in order to obtain a segmentation whose boundary reflects the global shape of the slab-like structure.

D.1. Setting a Threshold for Segmentation

Set the threshold level so as to minimize topological errors in the segmentation (i.e., holes or handles). While respecting this constraint, set the threshold such that the segmented boundary runs approximately midway through the thickness of the slab and therefore has a surface area that most accurately reflects the associated volume of the slab.

For cortex, use the Inner-Outer difference map as a substrate for thresholding. Set the threshold at a level that runs approximately midway through the cortical thickness such that the portion of the boundary running within cortical gray matter is topologically correct (i.e., equivalent to a disk). Determine by visual inspection or by automated topological analysis of the segmented volume or a subsequently generated explicit surface whether the segmentation contains topological errors. If errors are present, correct them by an interactive process that includes dilation or erosion of a restricted portion of the segmentation, or replacement by a segmented Outer-Inner difference map that is set at a threshold more appropriate for a particular region.

D.2. Identification of Subcortical Boundary Regions

Use a composite segmentation (Section IV.C) to identify regions along the thresholded difference map that do not lie within the slab-like region.

For the cortex, use the composite segmentation of subcortical structures to identify portions of the thresholded difference map that do not lie within cerebral cortical gray matter.

V. SURFACE GENERATION AND MANIPULATION

A surface is the infinitesimally thin interface defining the boundary between two regions. It can be represented as a discrete set of nodes that are linked to one another to form a wire-frame tessellation, thereby defining the topology of the surface. Optionally, each node in the surface can be assigned additional geometric characteristics, such as curvature, to represent local shape more smoothly and precisely. An inherent advantage of explicit surfaces over segmented volumes is that the position and orientation of the surface are not constrained by the discrete location and orientation of voxel boundaries.

A. Mathematical Operations on Surface Representations

Available methods that are utilized:
- generating explicit surface representations from closed-segmented volumes (e.g., using the Marching Cubes algorithm);
- smoothing a surface to reduce curvature and folding;
- projecting an extensively smoothed surface to a sphere;
- reducing distortions on the sphere while preserving surface topology;
- resampling the surface on the sphere; projecting resampled nodes back to original configuration;
- driving a surface that starts in an approximately appropriate location into improved registration with a target domain by gradient descent along an energy function.

Establish a method to improve the registration with probabilistic location and orientation data. This can be done by modeling the surface as a gaussian ridge with appropriate mechanical characteristics and using a gradient descent method to minimize the error between the ridge geometry and the target data on one or both sides of the ridge. (This utilizes information along the slopes, not just the energy minimum along trough; utilizes orientation information; and utilizes details about priors especially where two boundaries are in close proximity).

B. Surface Representations of Compartmental Boundaries

Initial Surface Generation

Use Marching Cubes or an equivalent method to generate an explicit surface reconstruction of the segmented boundary map.
- Delete portions of the surface that lie outside the sheet of interest, based on objective criteria such as proximity to portions of the thresholded Inner-Outer difference map that have been shown not to lie within cerebral cortical gray matter by a method such as that of IV.C and IV.D.2.
- Smooth the surface, project it to a sphere, and reduce distortions in surface area and shear using a flattening method such as multi-dimensional morphing that is applicable to spherical surfaces.
- Resample the minimally distorted spherical surface to establish uniform sampling and to establish a closed surface that approximates the gap along the natural or cut edges of the structure of interest.
- Project the surface back to its original 3-D configuration. Smooth any gaps along the natural termination of the structure of interest.

Generating inner and outer surfaces of slab-like structures.
- Use the composite inner boundary measure as an energy term, and use the derivative of the energy as a force that drives the initial surface along the radial axis (gradient of the Inner-Outer difference map) to an energy minimum, subject to constraints on the curvature and folding of the surface as it is deformed.
- Identify the resultant surface as the initial inner surface estimate. Similarly, use the derivative of the outer boundary energy measure to drive the surface along the radial axis to form an initial outer surface estimate.
- Refine the initial inner surface estimate by modeling it as a gaussian ridge and fitting it to the composite vector field representation of the inner boundary.
- Identify the resultant surface as the refined inner surface. Apply a similar procedure to generate a refined outer surface. Generating a middle surface representation for slab-like structures.
- For each triangle in the tessellation, define a prismoidal volume that interlinks the inner and outer surfaces. Define a triangle whose normal is the average between those of the inner and outer surface triangles and whose position along the radial axis divides the prismoid volume in half.
- Identify the resultant triangular tessellation a the middle surface of the slab. If the slab has natural terminations of its inner and outer surfaces, identify the prismoidal sides that interlink the edges of these surfaces.
- Use these to generate an explicit representation of the ribbon-like margin(s) of the slab. Determine the curvature tensor and the two principal curvatures for each node of the middle surface and the refined inner and outer surfaces.

VI. SHAPE CHARACTERIZATION AND GEOGRAPHIC SEGMENTATION OF SURFACES AND VOLUMES

A. Generate Refined Volume Representations of Segmented Volumes

For each structural compartment that has been segmented into a discrete volume bounded by explicit surfaces on all sides, identify all voxels that are intersected by the surface and all voxels contained entirely within the compartment. For intersected voxels, determine the fraction of the voxel lying within the enclosed compartment. Use this fractional occupancy measure for visualization purposes (intensity proportional to fractional occupancy) and for precise determination of compartment volume.

B. Volumetric Shape Analyses

For slab-like compartments, apply a gradient filter bank to the gradient of the Inner-Outer difference measure. Represent the tensor output as a 3×3 matrix at each voxel. Use curvature analysis to generate a tensor field representation of shape characteristics throughout the volume.

VII. OUTLINE OF MAJOR STEPS

The reconstruction process occurs as a complex sequence of operations that are grouped into six major stages, as schematized in FIG. 1. Maximal fidelity and richness of the final description can be achieved by applying all of the operations in each stage. However, the input data are of high enough quality it is feasible to obtain good representations (including topologically correct cortical surfaces) more rapidly by using streamlined versions at some stages. If the analysis objectives are more restricted, then some stages can be omitted altogether.

STAGE I.
CONDITION THE IMAGE DATA, IDENTIFY WHITE MATTER, AND GENERATE MASKS FOR INNER AND OUTER BOUNDARIES.
STAGE II (OPTIONAL).
GENERATE A COMPOSITE SEGMENTATION OF SUBCORTICAL STRUCTURES THAT CLEANLY ABUTS THE NATURAL BOUNDARIES OF NEOCORTEX.
STAGE III.
GENERATE PROBABILISTIC STRUCTURAL MAPS OF CORTICAL GRAY MATTER.

STAGE IV.
GENERATE AND PARAMETERIZE A TOPOLOGICALLY CORRECT INITIAL SURFACE REPRESENTATION.
STAGE V (OPTIONAL).
GENERATE REFINED ESTIMATES OF THE INNER AND OUTER BOUNDARIES.
STAGE VI (OPTIONAL).
GENERATE A FULL CORTICAL MODEL THAT INCLUDES EXPLICIT RECONSTRUCTIONS OF THE INNER, MIDDLE, AND OUTER SURFACES.

FIG. 1 is a schematic diagram illustrating the six major stages of the complex sequence of operations which constitute the reconstruction process according to the invention.

STAGE I. CONDITION THE IMAGE DATA, IDENTIFY WHITE MATTER, AND GENERATE MASKS FOR INNER AND OUTER BOUNDARIES

I.a. Provide Image Data

Suitable input image data include: (i) outputs of standard MRI scans (e.g., MP-RAGE); (ii) scalar representation of the combined outputs of multiple types of MRI scans analyzed to maximize the distinction between tissue types (e.g., by principal components analysis).

I.b. Condition the Image Data

Determine the intensity histogram peaks for gray and white matter for the entire volume using an automated or interactive method for peak detection. If the peak intensity values for cortical gray and white matter vary substantially in different regions of the image volume, reduce the variance in peak values by an existing normalization process. Adjust the sampling density to be (i) high enough to preserve meaningful structural details without aliasing after multiple stages of filtering, but (ii) low enough to avoid undue computational burden from filter sizes matched to the thickness of the cortical sheet. A preferred value for the sampling interval is one-sixth of the average thickness of the cortical sheet.

I.c. Determine a threshold level for white matter, using an interactive or automated method, such that the segmented boundary on average runs along the inner cortical boundary, between gray and white matter.

I.d. Threshold the image volume to obtain a segmented representation of white matter. If the analysis objectives do not require identification of the natural boundaries of neocortex, use dilation and erosion operations to generate a shell in the vicinity of the white matter segmentation that everywhere includes the estimated cortical inner boundary. Generate a second shell that everywhere includes the estimated cortical outer boundary. Use these as the Inner and Outer Masks in Stage III.

STAGE II (OPTIONAL). GENERATE A COMPOSITE SEGMENTATION OF SUBCORTICAL STRUCTURES THAT CLEANLY ABUTS THE NATURAL BOUNDARIES OF NEOCORTEX (Optional; to be applied if the volume of interest includes the entire hemisphere or a portion in which neocortex adjoins its natural boundaries, and if the analysis objectives include a need to identify the natural boundaries of neocortex in the reconstructed surface.)

II.a. Determine an intensity threshold such that the boundary of the segmented region runs reasonably close to the inner boundary but does not contain artifactual fusions with other white matter regions (e.g, in the cerebellum) that would corrupt subsequent flood-filling of cerebral white matter.

II.b. Generate segmentations of key subcortical structures and regions, including the lateral ventricle; the basal ganglia; the thalamus; the brainstem; the hippocampus and amygdala; cerebral white matter; the corpus callosum; large blood vessels coursing in and near the cerebrum; and structures within the orbit of the eye. Obtain these segmentations using a combination of thresholding, flood-filling, dilation, erosion, smearing, and sculpting steps appropriate for each structure.

II.c. Combine these volumes so as to create an aggregate segmentation that includes cerebral white matter (but excludes non-cerebral white matter regions) plus all gray matter structures that adjoin cerebral neocortex. Identify this as the cerebral white matter plus subcortical segmentation.

II.d. Use dilation, erosion, and volume combination operations applied to the cerebral white matter plus subcortical segmentation to generate an Inner Mask and an Outer Mask that are identical to those generated in Stage I.c. except that core subcortical regions have been removed.

Figure 12:
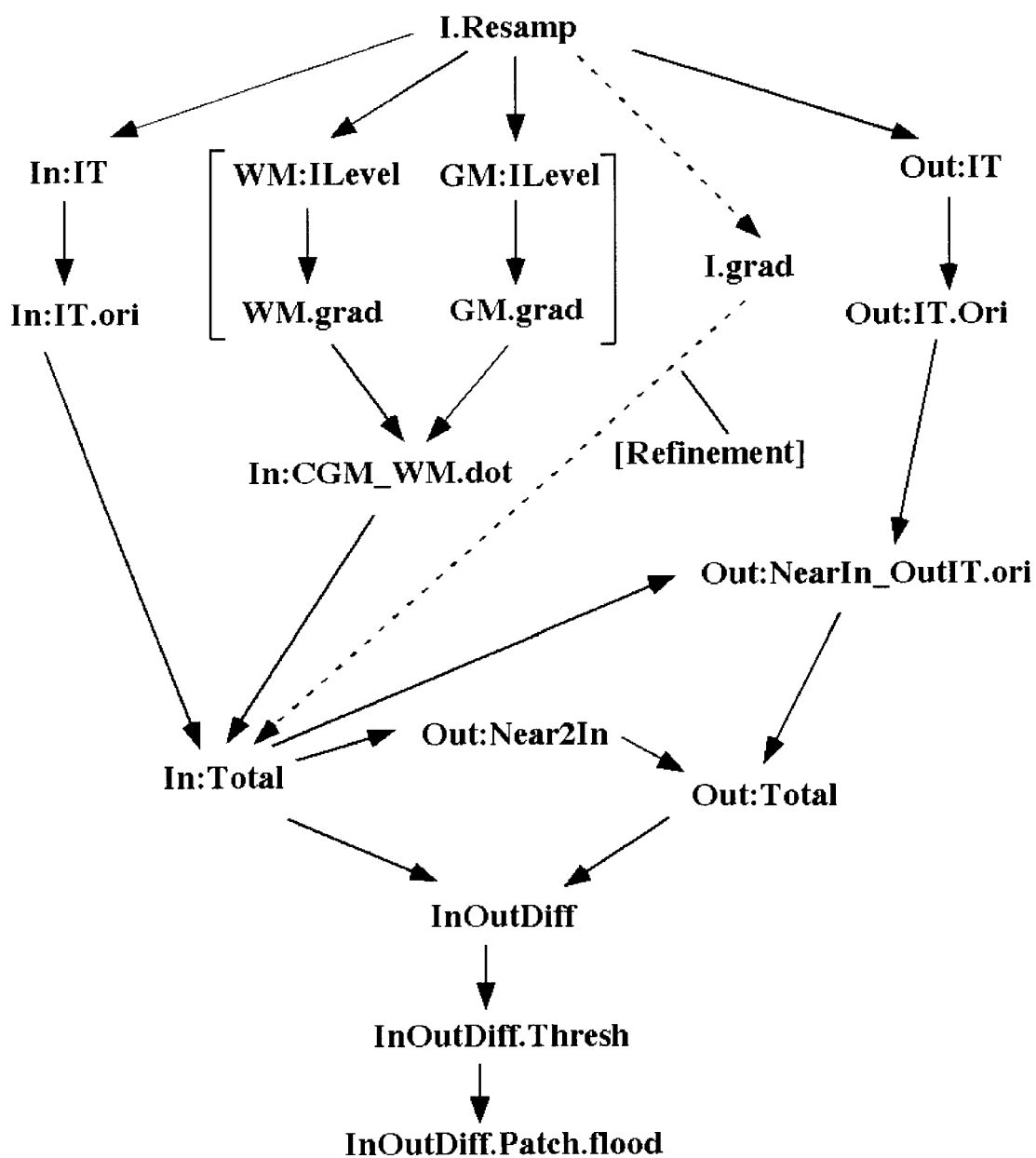
FIG. 12 illustrates the sequence of processing steps involved in Stage III of the Sure-Fit method.
Figure 13A:
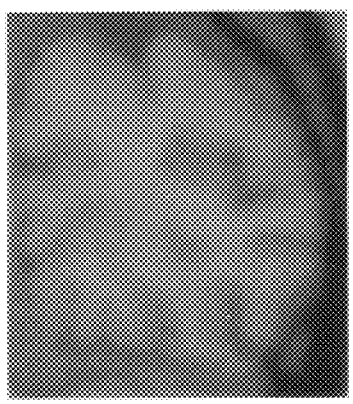
FIGS. 13A–13G are photographs illustrating various reconstructions including.
Figure 13B:
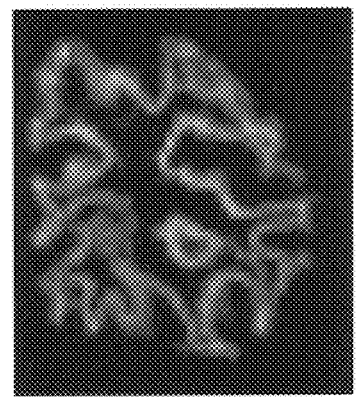
Figure 13C:
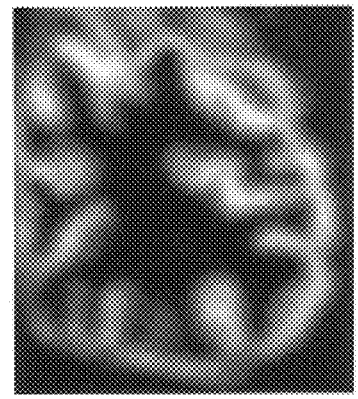
Figure 13D:
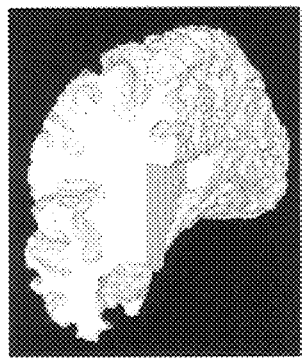
Figure 13E:
Figure 13F:
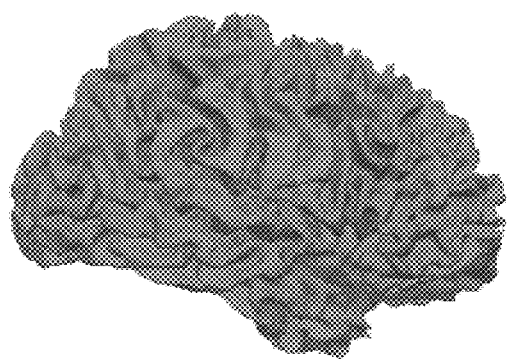
Figure 13G:
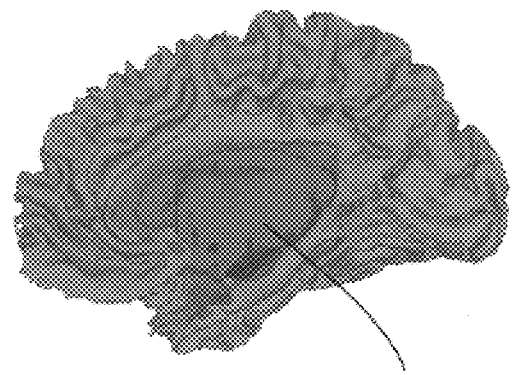

STAGE III. GENERATE PROBABILISTIC STRUCTURAL MAPS OF CEREBRAL CORTEX WITHIN THE MASKED REGION (See FIG. 12 for a flow chart of steps in Stage III.)
(See FIG. 12 for a flow chart of steps in Stage III.)

III.a. Assemble evidence for the inner cortical boundary, based on criteria of: image intensity intermediate between gray and white matter); quasi-planarity of the initial inner boundary estimates; plus evidence for white matter on one side and gray matter on the other, based on gradients of white matter and gray matter that are large in magnitude and opposite in orientation. For the computationally intensive steps, apply the Inner Mask generated either in Stage I or Stage II.

III.b. Assemble evidence for the outer cortical boundary, based on criteria of image intensity intermediate between gray matter and CSF); quasi-planarity of the initial outer boundary estimate; evidence for inner border at appropriate distance and orientation on one or both sides. For the computationally intensive steps, apply the Outer Mask generated either in Stage I or Stage II.

III.c. [optional] Assemble evidence for cortical gray matter, based on criteria of: image intensity; and proximity to inner and outer boundary regions approximately parallel to one another and spaced according to known cortical thickness.

III.d. Generate a difference map between inner and outer cortical boundaries, after appropriate blurring to generate a smooth gradient throughout the thickness of the cortical sheet, and with cerebral white matter set at the same level as the inner boundary maximum. Identify this as the In-Out Difference map. Generate a gradient vector field map of the difference map. crown regions, based on evidence of outward folding surrounding an inner border (OutFold). Generate a vector field map of sulcal fundal regions, based on evidence of inward folding surrounding an outer border (InFold). Generate a map of gyral lip regions, based on evidence for elongated regions of CSF adjacent to paired ridges of high outward folding. Generate maps of dimpled, bulged, and saddle-shaped regions that are likely to represent terminations or junctures of sulci or gyri, based on measures of intrinsic curvature, including positive inward (InDent), positive outward (OutBump), or negative (Saddle).

STAGE IV. GENERATE AND PARAMETERIZE A TOPOLOGICALLY CORRECT INITIAL SURFACE REPRESENTATION.

IV.a. Segment the In-Out boundary

Threshold the In-Out Difference map so that the boundary runs approximately midway along the cortical thickness and by inspection appears topologically equivalent to a disk in this region (no holes near the white matter or fusion near the pial surface).

IV.b Use patching and pasting operations to correct any topological errors in the segmentation (handles or holes) that are detected by visual inspection of the volume or after inspection of the reconstructed smoothing (by smoothing and/or Euler count).

IV.c. Generate an Initial Cortical Surface

Apply the Marching Cubes algorithm to the cortical connected volume to generate an explicit surface representation. (For a demonstration of reduction to practice of the method to this stage, see FIGS. 13A–13G.) Classify nodes as cortical gray matter (CGM) if they lie within one voxel of the boundary of the segmented In-Out Difference map but not within one voxel of the subcortical core mask. Delete non-CGM nodes from the surface. Determine whether Euler number for the remaining (CGM) surface is 1, signifying topological equivalence to a disk. If the Euler number exceeds unity, apply a local Euler check and correct topological errors in the initial cortical segmentation where identified.

IV.d. Resample the surface and generate a topologically closed surface, including smoothed representations of the non-cortical gap. Extensively smooth the cortical surface by a standard smoothing (relaxation) algorithm. Geometrically project it to a spherical shape and insure that it remains topologically correct (not folded on itself). Resample the surface to give a regular hexagonal spacing on the sphere. Do multi-resolution morphing to reduce distortions in surface area on the sphere relative to that in the original 3-D configuration. Classify all resampled nodes as CGM+ if they project to a tile that contains at least two CGM+ nodes. Otherwise classify nodes as CGM−, used to represent the gap along the medial wall (for full hemisphere reconstructions). Identify edge nodes as those having at least one CGM+ neighbor and one CGM− neighbor. Project the resampled nodes back to the original 3-D cortical shape. Smooth the CGM− nodes while holding CGM+ nodes fixed, to approach a minimal surface area (soap-film equivalent) for the non-cortical surface. This constitutes the Fiducial Initial Cortical Surface reconstruction. {FICS}.

STAGE V (OPTIONAL). GENERATE REFINED ESTIMATES OF THE INNER AND OUTER

V.a. Generate a refined Inner Mask by excluding regions that lie outside the initial cortical segmentation (or a modestly dilated segmentation) and a refined Outer Mask by excluding regions that lie inside the cortical segmentation (or a slightly eroded segmentation).

V.b. Generate a refined inner boundary estimate, using the refined Inner Mask and using the masked intensity gradient (rather than the combined white matter and gray matter gradients) as the gradient-based evidence for the inner boundary, but otherwise the same method as described in STAGE II.a.

V.c. Generate a refined outer boundary estimate, using the refined Outer Mask and the refined inner boundary estimate, but otherwise the same method as described in Stage III.b.

V.d. Generate a refined In-Out Difference map using the refined inner and outer boundary estimates.

STAGE VI. (OPTIONAL) GENERATE A FULL CORTICAL MODEL THAT INCLUDES EXPLICIT RECONSTRUCTIONS OF THE INNER, MIDDLE, AND OUTER SURFACES.

VI.a. Inner Surface

Drive the {FICS} into close registration with the inner boundary estimate (original or refined) using a modification of an existing balloon method for surface deformation. Use the vector field gradient between inner and outer boundary estimates (InOutGrad) as a force field that drives the deformation and constrains surface nodes to remain in a topologically correct configuration. Assign appropriate stiffness characteristics to the surface in order to tolerate a reasonable degree of folding but penalize high intrinsic curvature. Generate a more refined inner surface estimate {ICS} by an energy-minimization method that provides an optimal fit between the surface (modeled as a gaussian ridge of appropriate stiffness characteristics) and the volumetric estimates of inner boundary orientation and location.

VI.b. Outer Surface

Drive the {FICS} into close registration with the outer boundary estimate (original or refined) by a balloon deformation process equivalent to that in (VI.a). Refine the outer surface estimate {OCS} by an energy minimization method applied to a gaussian ridge model equivalent to that in (VI.a).

VI.c. Middle Surface

Using a standard geometric formula, determine the volume of each prismoid defined by a tile in refined inner surface, the corresponding tile in the refined outer surface, and the three quadrilateral faces defined by the links between corresponding nodes of the two tiles. (For a more precise estimate, the volume of each prismoid can be adjusted to include the increments or decrements associated with convexity or concavity of the inner and outer surfaces, as determined from measures of surface curvature.) Identify the unique tile whose surface normal is the average of that of the inner and outer tiles and which splits the prismoid (or prismoid with convex/concave faces) into equal volumes above and below. Identify this tessellation as the middle surface {MCS}. Identify the ribbon-like surface along the termination of cortex as a set of tiles containing only edge nodes (from the middle surface and either the inner or the outer surface).

VI.d. Fully Parameterized Representation of the Cortical Volume

Do multi-resolution spherical morphing on the middle surface representation. Align to a standard origin and orientation of the spherical coordinate system relative to identified geographic landmarks (e.g., origin at the tip of the central sulcus). Resample and assign nodes surface-based coordinates of latitude and longitude. Determine radial axis representation for each node using the flow field of the in-out gradient. (This can be as simple as a single vector or a more complex spline-like measure of curvature and orientation along the radial axis). This defines the location of each point in the cortical volume in coordinates that are most naturally related to underlying cortical anatomy. Generate a probabilistic volumetric representation of the full cortical sheet, in which each voxel has a CGM value ranging from zero to unity, determined by the fraction of its volume that is contained within in the volume bounded by the inner surface, outer surface, and the ribbon-like termination of cortex.

VI.e. Tensor Field Analysis of 3-Dimensional Cortical Geometry

Analyze the differential geometry associated with spatial gradients in how the radial axis is oriented in 3-D space, using the unit normals of the vector field gradient between inner and outer boundary estimates (InOutGrad) as the measure of radial axis orientation and polarity. Take the gradient of this vector field of unit normals and generate a tensor field containing a 3×3 matrix of information about gradients in the radial axis of the cortex. Diagonalize this matrix and use the matrix values to describe the differential geometry of the cortical volume along its natural coordinate system of a radial dimension (r) and two tangential dimensions. This includes estimates of the two principal curvatures at each point, the average of the principal curvatures (mean curvature, a measure of folding), and the product of the principal curvatures (intrinsic curvature).

In view of the above, it will be seen that the several objects of the invention are achieved and other advantageous results attained.

As various changes could be made in the above methods without departing from the scope of the invention, it is intended that all matter contained in the above description and shown in the accompanying drawings shall be interpreted as illustrative and not in a limiting sense.

APPENDIX 1. MODELING OF CORTICAL STRUCTURE

A. Anatomical Characteristics (Priors)

Figure 2A:
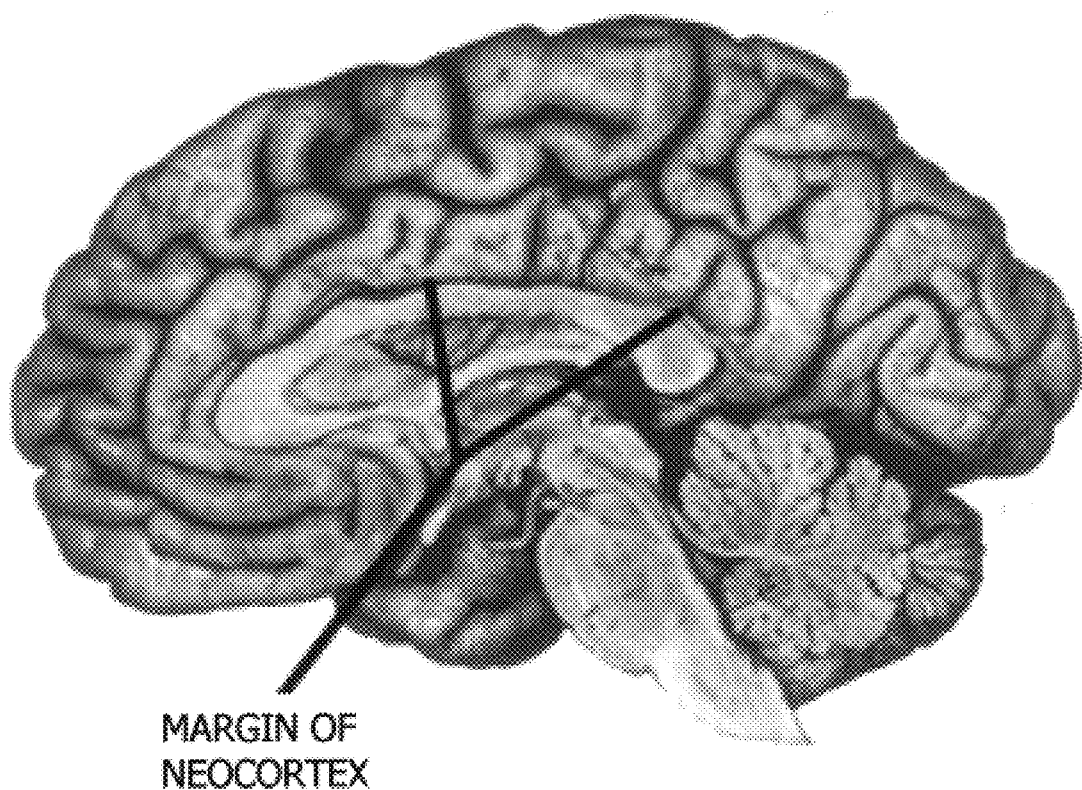

A.1. Global Characteristics (Anatomical prior 1) Cerebral cortex is a sheet of tissue that wraps around most of the cerebral hemisphere, except for a gap along the medial wall, as illustrated in FIG. 2A for the highly convoluted human cortex.

(Anatomical prior 2) The cortex is topologically equivalent to a hollow sphere with a hole (FIG. 2B), which in turn is topologically equivalent to a hemisphere (FIG. 2C) and to a flat disk (FIG. 2D) that has an inner boundary (bottom of disk), an outer boundary (top of disk) and a thin perimeter margin along the natural termination of neocortex (or along artificial cut if only part of the hemisphere is being reconstructed). A 2-dimensional surface, or disk (FIG. 2E) is an infinitesimally thin representation that can represent the inner boundary, the outer boundary, or a layer in between.

A.2. Local Characteristics

Figure 3:
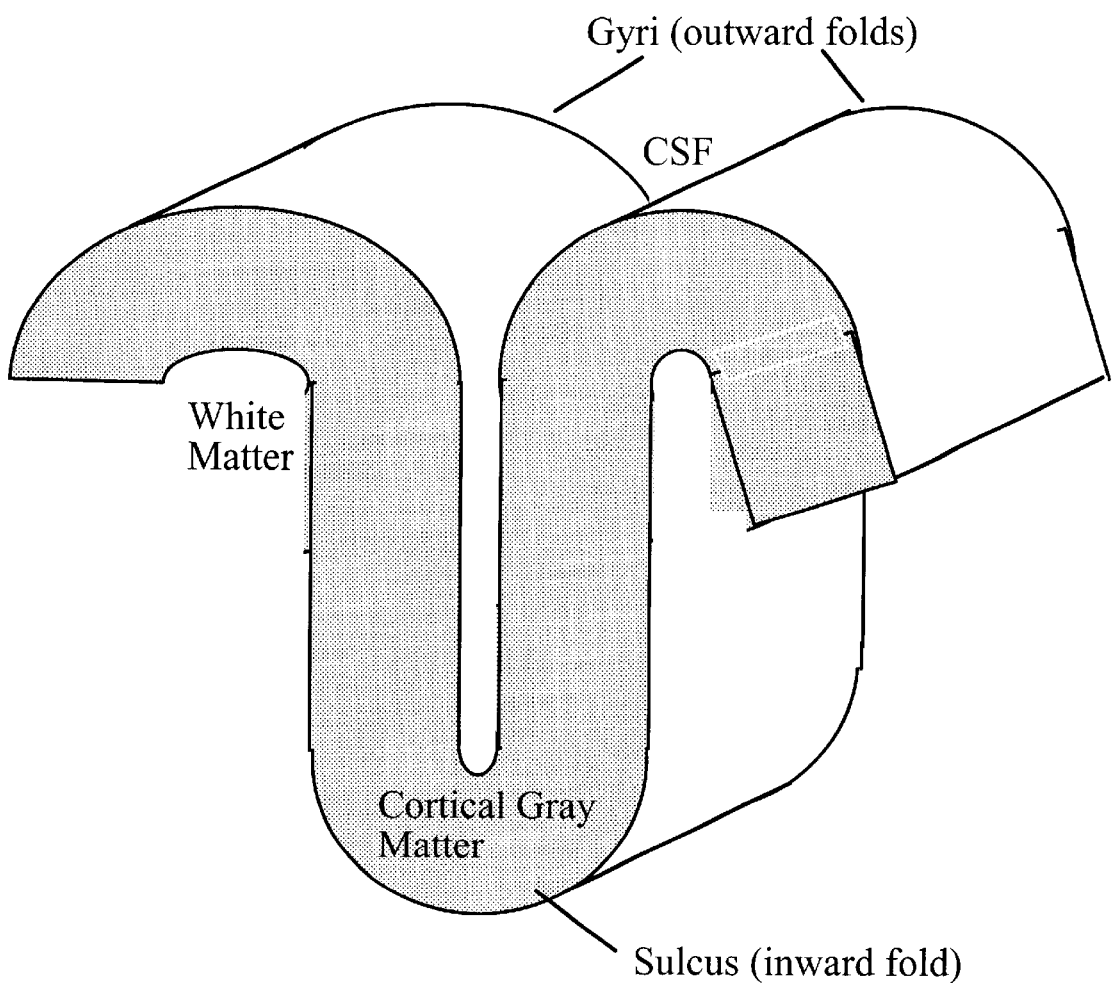
FIG. 3 illustrates the local aspects of cortical shape.

Local aspects of cortical shape are shown in FIG. 3, which schematically illustrates a cortical sulcus and adjacent gyral folds.

(Anatomical prior 3) Cortical thickness is relatively constant for any given individual and any given species.

(Anatomical prior 4) On its inner side, cortex is everywhere bounded by white matter (Anatomical prior 5) On its outer side, cortex is bounded in gyral regions by cerebrospinal fluid (CSF) whereas in sulcal regions it is folded against an oppositely oriented sheet of cortex (with a thin and sometimes negligible gap containing CSF).

(Anatomical prior 6) The cortical sheet tends to be either relatively flat or else folded along a single axis (i.e., the intrinsic curvature is generally small, but the mean curvature is high along crowns of gyri and fundi of sulci).

(Anatomical prior 7) There are strong correlations between the sharpness of folding along inner and outer boundaries. Along outward (gyral) folds, the inner boundary is sharply creased and the outer boundary is gently folded, whereas the converse applies along inward (sulcal) folds (sharp creasing of outer boundary, gentle folding of inner boundary). The middle surface is less extreme in the maximum degree of folding.

Many components of the SURE-FIT strategy for cortex can be modeled using a simpler pair of anatomical models, one appropriate for relatively flat gyral regions and the other for relatively flat sulcal regions.

Figure 4B:
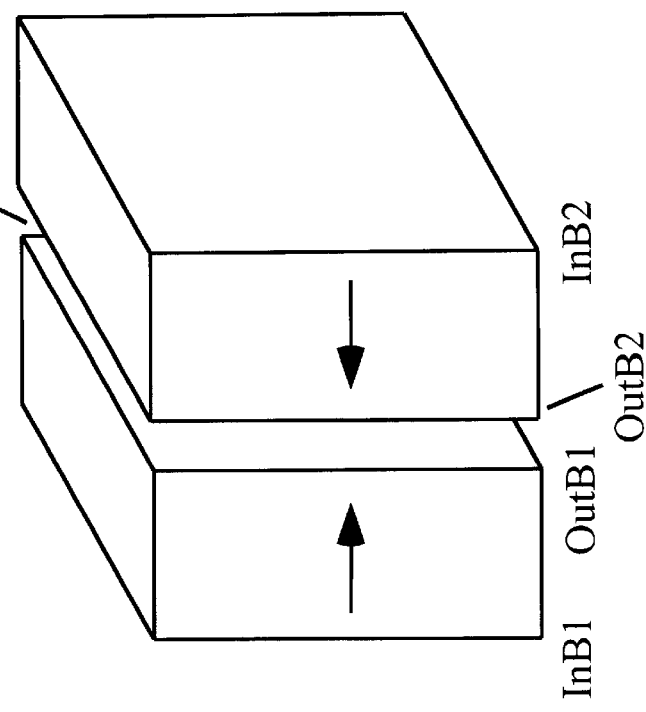
FIGS. 4A and 4B illustrate the basic structural model of locally flat patches of cortex including the Gyral model which has a single slab on the left (FIG. 4A) and the Sulcal model which has anti-parallel slabs on the right (FIG. 4B).
Figure 4A:
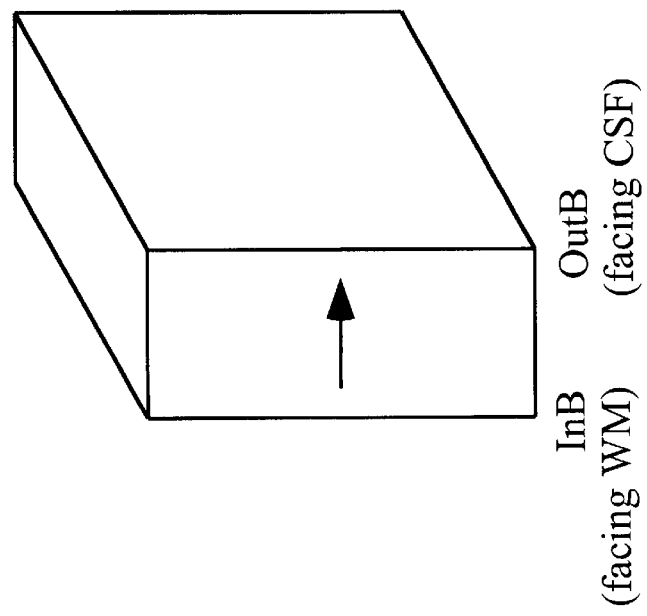

FIGS. 4A and 4B illustrates the basic structural model of locally flat patches of cortex including the Gyral model which has a single slab on the left (FIG. 4A) and the Sulcal model which has anti-parallel slabs on the right (FIG. 4B).

B. Image Model

For structural MRI images and images of the cut brain surface, there are four main priors, relating to (i) the material composition and the nature of compartmental boundaries, (ii) image blur, (iii) local image noise, and (iv) regional nonuniformities in imaging characteristics.

B.1. Material Composition and Compartmental Boundaries (Imaging prior 1) Each major tissue compartment (white matter, gray matter, and CSF) has a relatively uniform material composition and sharp anatomical boundaries.

Figure 5A:
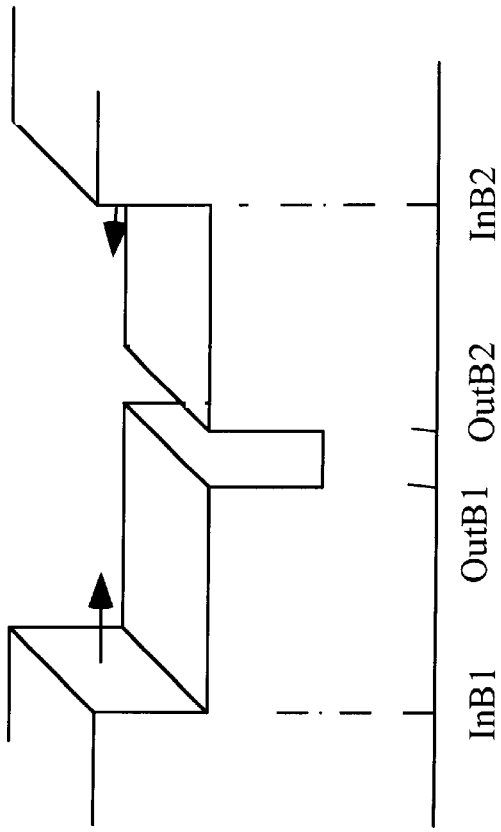
FIGS. 5A and 5B illustrate the expected intensity distribution for Gyral and Sulcal models, respectively, in the absence of image and spatial blur.
Figure 5B:
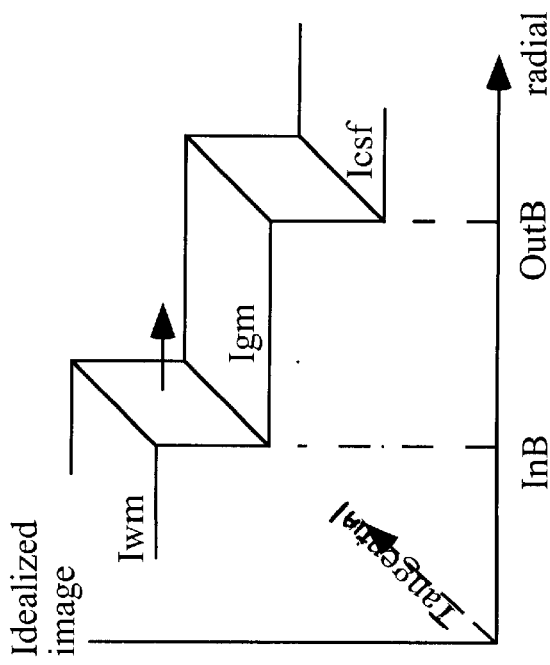

The predicted image intensity pattern if there were no noise or spatial blur is shown in FIGS. 5A and 5B.

The gradient, or spatial derivative of this idealized image intensity would be flat everywhere except along boundaries, where it would be a sharp, narrow peak (a delta function).

B.2. Effects of Image Blur (Imaging prior 2) Blurring of anatomically sharp boundaries is often a substantial fraction of cortical thickness.

Figure 6A:
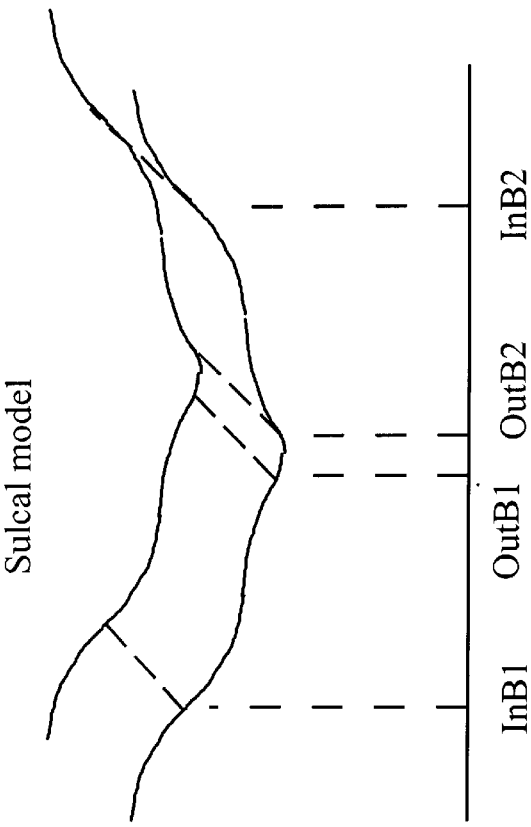
FIGS. 6A and 6B illustrate the expected intensity distribution for Gyral and Sulcal models, respectively, after blurring of the image (but without noise).
Figure 6B:
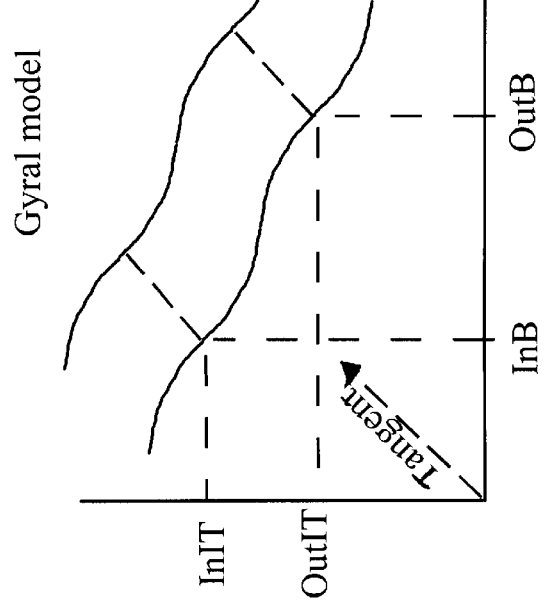

FIGS. 6A and 6B shows the predicted image intensity pattern after blurring (but without noise).

Figure 7A:
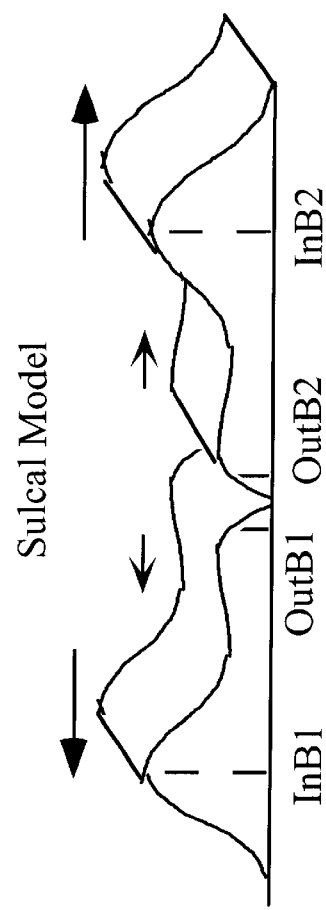
FIGS. 7A and 7B illustrate the spatial derivative for Gyral and Sulcal models, respectively, of the blurred intensity pattern as a gradient vector field whose magnitude is shown by the height of the curve and whose direction is indicated by the arrows. The derivative of the image intensity along the x-axis is illustrated for the Gyral model in FIG. 7A (left) and for the Sulcal model in FIG. 7B (right).
Figure 7B:
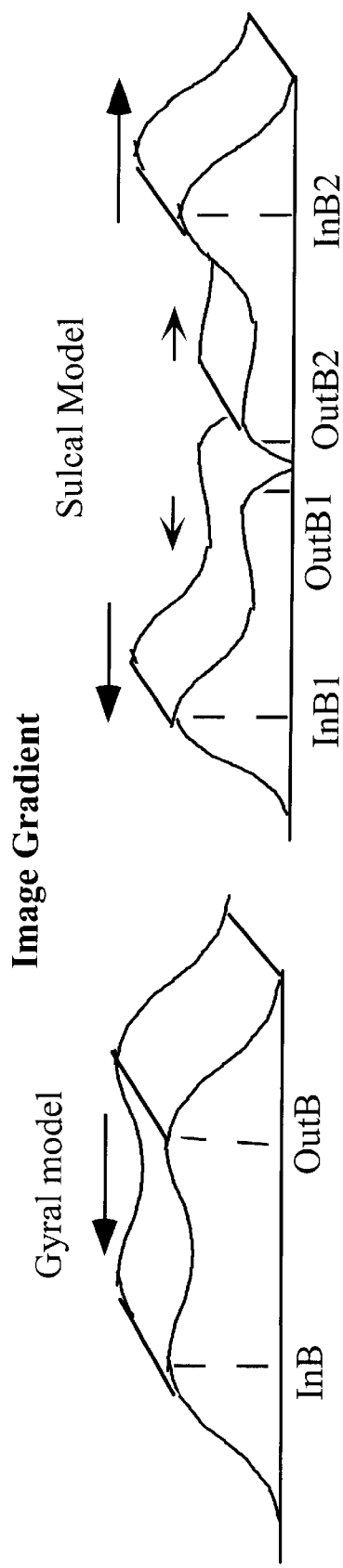

The spatial derivative of the blurred intensity pattern is a gradient vector field whose magnitude is shown by the height of the curve and whose direction is indicated by the arrows in FIGS. 7A and 7B.

B.3. Effects of Intrinsic Noise (Imaging prior 3) Noise in the voxel data tends to be substantial and is presumed to have an approximately Gaussian distribution about the mean value for each material type.

Figures 8A, 8B:
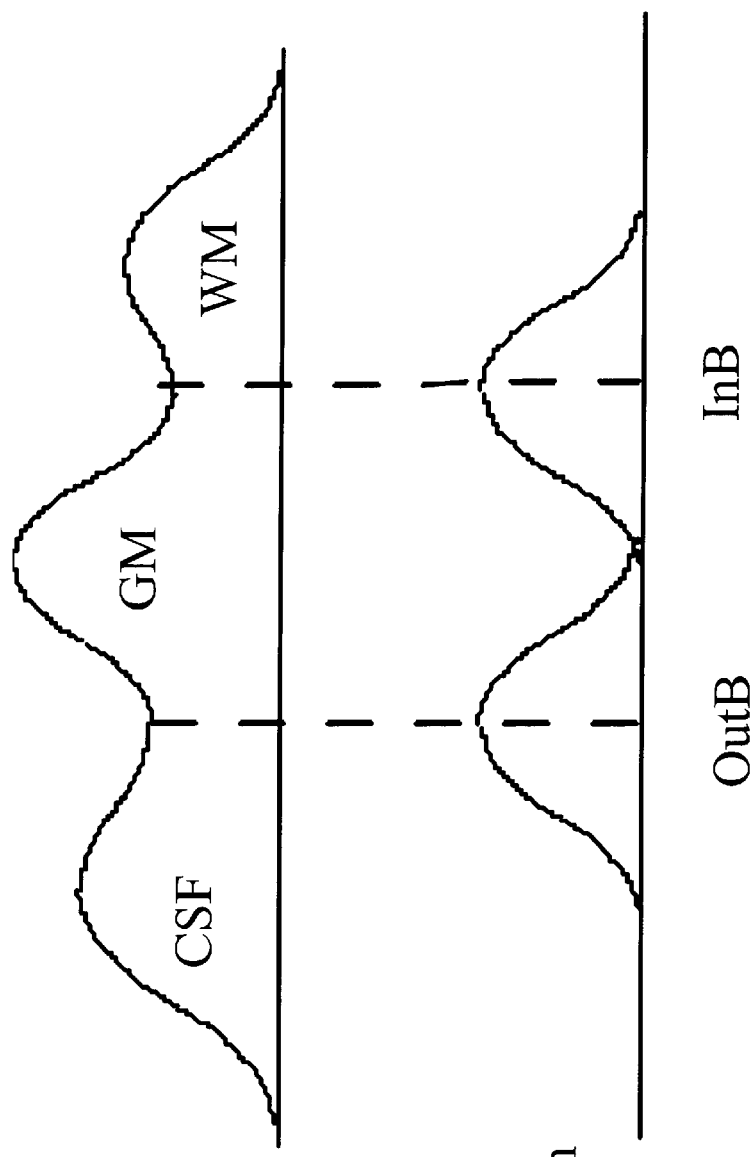
FIGS. 8A and 8B illustrate the intensity histogram and associated major tissue types in FIG. 8A (upper panel) and the intensity histogram for the outer and inner borders of FIG. 8B (lower panel).

The intensity histogram for each material type has a relatively broad peak, because of intrinsic noise, spatial blur near boundaries, and regional biases from imaging nonuniformities. FIG. 8A schematizes the overlapping distribution of curves typically encountered in structural MRI data for the three major materials in cerebral tissue, namely, white matter (WM), gray matter (GM), and cerebrospinal fluid (CSF).

As schematized in FIG. 8B, voxels located along the inner boundary (InB), should have an intensity distribution (i.e., a boundary intensity histogram) that is an approximately gaussian curve centered around a value intermediate between the gray matter and white matter peaks in the material intensity histogram. Similarly, for voxels located along the outer boundary (OutB), the predicted intensity distribution is a curve centered around a value intermediate between the gray matter and CSF peaks The actual intensity distribution in an image can be transformed using equations that describe each boundary intensity model. As shown in FIGS. 9A and 9B, the spatial pattern after transforming to collect evidence for inner borders should reveal ridges along the trajectory of the inner boundary, subject to the uncertainties of noise.

Likewise, as shown in FIGS. 10A and 10B, after transforming to collect evidence for outer borders, the spatial pattern should reveal strong ridges in gyral regions but weak ridges in sulcal regions, because the intensity signal is inherently weaker where the CSF gap is narrow.

Based on this conceptual framework, additional analyses related to local shape characteristics and the geometric relationships between inner and outer boundaries can be used to enhance and refine each type of border measure.

C. A Model of the Middle Cortical Layer

Figure 11:
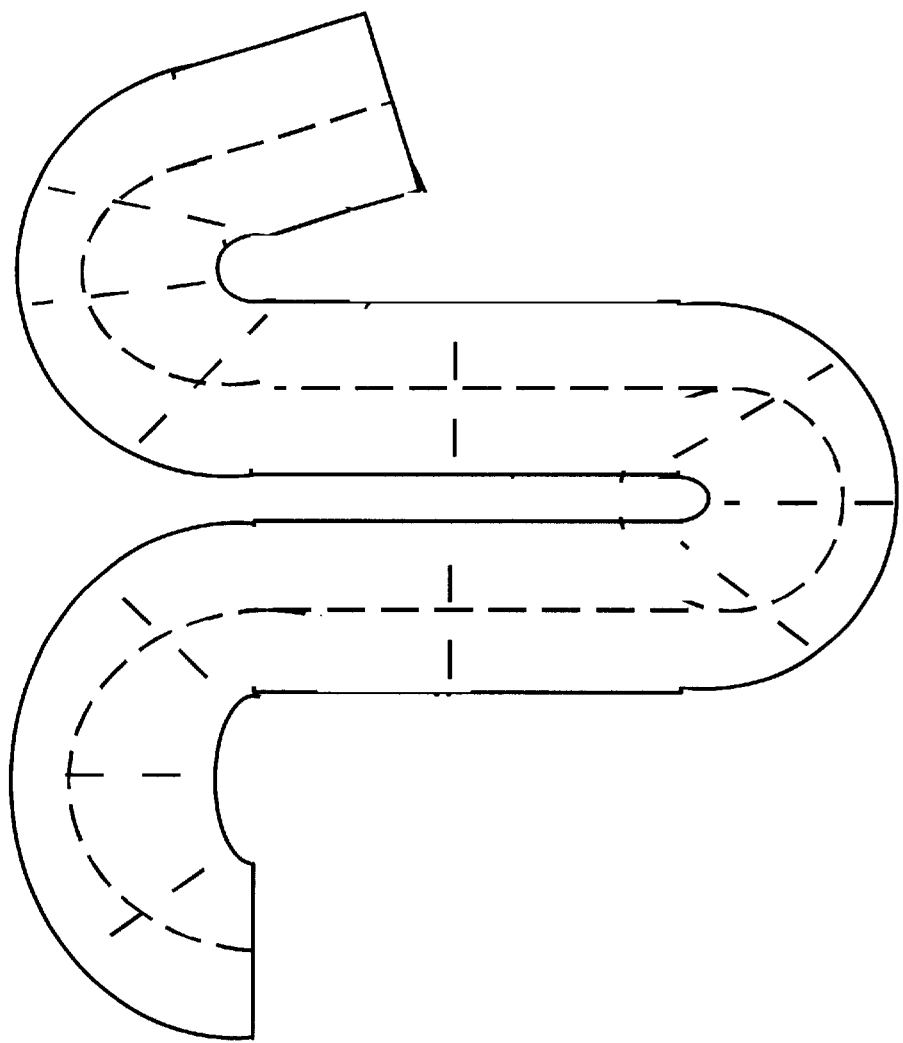
FIG. 11 is an illustration of the middle cortical layer.

FIG. 11 is an illustration of the middle cortical layer.

In flat regions, the radial axis is normal to the middle surface, which lies midway between inner and outer boundaries. In sulcal regions, the middle surface is biased towards the inner boundary and the radial axis arcs away from the crease along the outer boundary. In gyral regions, the middle surface is biased towards the outer boundary and the radial axis arcs away from the crease along the inner boundary.

The radial axis is defined anatomically by the dominant orientation of the apical dendrites of pyramidal cells. The middle surface is defined geometrically as the surface associated with equal volumes immediately above and below when extended along the radial axis. The middle surface is particularly suitable for representing cortical shape, because its surface area is proportional to the associated cortical volume in regions where thickness is constant.

APPENDIX 2. ORIENTED 3-D FILTERS

A. Choice of Filter Profiles

Linear filters are used to locate regions where the volume data has sharp gradients, or where there are peaks or ridges in the intensity. Gradients are characterized by a measure of the steepness of the rate of change, while peaks or ridges are characterized by their height, and the shape of the local curvature. It is also important to have a measure of the orientation of these features relative to the coordinate system. Because linear filtering of volume data sets is computationally intensive, it is important to have the smallest number of filters that provide measures of the magnitude and orientation of these features with an acceptable level of precision, in particular with minimal systematic bias in determining the orientation. It is also important that these filters be constructed in such a way as to minimize computational cost. The filters described in this Appendix 2 were designed to meet these conditions.

An idealized form for the filters are Gaussian weighted sinewaves.

$$f(\vec{r}, \vec{k}) = \exp(i\vec{k} \cdot \vec{r})\exp(-|\vec{r}|^2/2\sigma^2) \quad (1)$$
$$= (\cos(\vec{k} \cdot \vec{r}) + i\sin(\vec{k} \cdot \vec{r}))\exp(-|\vec{r}|^2/2\sigma^2)$$

where $\vec{r} = [x,y,z]$ is a spatial location in the filter and $\vec{k}$ is a wavevector that specifies the spatial frequency, or the direction and wavelength $\lambda = 2*\pi/|\vec{k}|$ of the wave. The variance $\sigma$ of the Gaussian is typically taken to be on the order of magnitude of the wavelength of the wave. The imaginary part $\{\sin(\ )\}$ of the filter provides a strong response at gradients that are oriented in the direction of the wave, while the real part $\{\cos(\ )\}$ has a strong response when centered in a slab like region that is oriented along the direction of the wavevector $\vec{k}$. Ideally, one would like to run such a filter at all spatial locations, using a range of magnitudes of the wavevector and orientations, but this is computationally expensive to do.

B. Choice of Discrete Orientations

The orientation of the filters is discretized to a finite number. To ensure a uniform sampling of all directions in 3 space, the orientations of the filters are constrained to lie along the direction of the faces (nodes or edges) of one of the 5 regular solids, tetrahedron, cube, icosahedron, dodecahedron and icosohedron. It can be shown the 12 directions, or 6 orientations of the faces of the dodecahedron provide a minimal selection for characterizing the local features in the data set. In this case the wavevectors are defined as $\vec{k}_\alpha = k_{mag} \vec{u}_\alpha \alpha = 1$ to 6, where $k_{mag}$ specifies the magnitude of the wavevector and the $\vec{u}_\alpha$ are unit vectors pointing toward the faces of the dodecahedron.

$$u_0 = \{0.0, 0.0, 1.0\} \quad (2)$$

$$u_1 = \frac{1.0}{\sqrt{5.0}}\{2.0, 0, 1.0\}$$

$$u_2 = \frac{1.0}{\sqrt{5.0}}\{2*\cos(\phi_0), 2*\sin(\phi_0), 1.0\}$$

$$u_3 = \frac{1.0}{\sqrt{5.0}}\{2*\cos(2*\phi_0), 2*\sin(2*\phi_0), 1.0\}$$

$$u_4 = \frac{1.0}{\sqrt{5.0}}\{2*\cos(3*\phi_0), 2*\sin(3*\phi_0), 1.0\}$$

$$u_5 = \frac{1.0}{\sqrt{5.0}}\{2*\cos(4*\phi_0), 2*\sin(4*\phi_0), 1.0\},$$

where $$\phi_0 = \frac{2*\pi}{5.0}$$

radians. This particular definition puts the first unit vector along the z axis, and places the second one in the xz plane. The rest of the orientations are then defined by the properties of the dodecahedron. This particular choice of orientation is arbitrary. The magnitude of the wavevector is typically taken to be $\pi/8$ when the filters are used to analyze the location and orientation of thick slab like objects, or gradual gradients, and $\pi/4$ when analyzing thin slab like objects or steep gradients.

The Gaussian part of the filter is approximated by a discrete, separable filter of the form $$\exp(-|\vec{r}|^2/2*\sigma^2) \sim h(x)h(y)h(z) \quad (3)$$

where h(n) is one of the following choices $$h[n] = [\frac{1}{4}, \frac{1}{2}, \frac{1}{4}]$$

$$h[n] = [h2, \frac{1}{4}, \frac{1}{2} - 2*h2, \frac{1}{4}, h2]$$

$$h[n] = [h3, h2, \frac{1}{4} - h3, \frac{1}{2} - 2*h2, \frac{1}{4} - h3, h2, h3] \quad (4)$$

The preferred version is the one with five coefficients with the parameter $h2=\frac{1}{16}$. The preferred choice of parameters for the filter with 7 coefficients are $h3=\frac{1}{64}$, $h2=\frac{3}{32}$. Typical choices are to use the 5 tap filter with $k_{mag}=\pi/4$ and the 7 tap filter with $k_{mag}=\pi/8$.

C. Procedure for Efficient Computation

The computational load for applying these filters to the volume data set is reduced significantly using the following procedure, which produces the same result obtained by directly applying the filters.

1. For each orientation a, modulate the image by multiplying each voxel element with the carrier wave exp $(ik_\alpha \cdot \vec{r})$, where $\vec{r}$ is the spatial location of the voxel.
2. Lowpass filter the modulated images with the separable filter h[x]h[y]h[z], which can be done in 3 sequential operations along the x,y,z axes respectively.
3. Demodulate the lowpass filtered results with $\exp(-ik_\alpha \cdot \vec{r})$ For example, the number of multiplies per voxel when directly applying each filter using the separable 5 tap filter is $5^3=125$, while using this procedure only requires 3*5+2= 17 multiplies. The reduction is even greater using the 7 tap filter.

Detailed analyis and numerical simulations have shown these filters are able to locate points of maximum gradients in intensity, and extrema points, such as the center of slabs. They provide measures of the magnitudes and orientation of such features with systematic biases less than a few percent.

APPENDIX 3. PROCESSING STEPS AND SOFTWARE IMPLEMENTATION DESIGN

Section A below includes the sequence of processing steps for cortical surface reconstruction without the optional subcortical segmentation process. It includes Stages I, III, and IV (Stage II is skipped). Section B below describes a sequence of processing steps that includes subcortical segmentation. It includes Stages II–IV (Stage I is skipped). Stages V and VI are applicable after processing via either Section A or Section B.

Operations (filters, transformations, etc.) are indicated in italics and are described in Appendix 4.

Volume data can be specified as scalar volumes, indicated in regular font, or vector volumes, indicated in bold. Vector volumes include unit normal fields (vol.norm); 3-D vector fields with an identified magnitude and unit normal (4 numbers: vol.vec=[vol.mag, vol.norm]); or vector field outputs of filter banks (vol.bank=(vol.alpha0, . . . ,vol.alphamax)).

Format for individual steps:
OutputFile=Operation (InputFile[s], [key parameters])

A. A SPECIFIC SEQUENCE OF PROCESSING STEPS SUITABLE FOR RECONSTRUCTING CEREBRAL CORTEX WITHOUT CONCOMITANT SUBCORTICAL SEGMENTATION

Stage I. Generating Masks to Restrict Subsequent Analyses

I.a. Renormalizing and Conditioning the Image Data
Designate the raw input image as I.raw
Resample the image data so that the average cortical thickness is equivalent to about 6 voxels. For human cortex, with an average cortical thickness of 3 mm, an structural MRI volume at 1 mm voxel size entails resampling by factor of 2: [optional: renormalize the image data to compensate for regional heterogeneity in the image intensity distribution, using an available renormalization method identified as "Renormalize".]
I.renorm=Renormalize (I.raw)
I.Resamp=Interpolate(I.renorm)

I.b. Determine Inner and Outer Masks
InnerMask=MakeShell (WM.thresh, dilate ~4 steps, erode ~5 steps)
OuterShell=MakeShell (WM.thresh, dilate ~12 steps, erode ~2 steps)

I.c. Determine Parameter Values
Set parameters needed for generating inner and outer masks and boundaries. These include the peak, upper and lower standard deviations for WM, GM, In:IT, Out:IT (based on interactive assessment of intensity histogram and of selected characterstics of cortex in the image volume); plus the standard deviations (narrow and wide axes) for filters, plus spatial offsets (based mainly on cortical dimensions relative to sampling density)

[Stage II (Skip) (Subcortical segmentation; see Section B.)]

Stage III. Probabilistic Representations of Cortical Structure. See FIG. 12 for Schematic Flow Chart and FIG. 13B, C for Examples of Inner and Outer Boundary Estimates III.a. Inner Cortical Boundary
In:IT=ClassifyIT(I.Resamp, InITmean)
In:IT.ori=Orient(In.IT)
WM:ILevel=ClassifyIT (I.Resamp, WMpeak)
WM.grad=Grad(WM:ILevel)
GM:ILevel=ClassifyIT(I.Resamp, GMpeak)
GM.grad=Grad(GM:ILevel)
In:CGM_WM.dot=(CombineVec(dotsqrtrectMinus_SecondNorm, CGM.grad, WM.grad))
In:Total.vec=Combine(2vec_SecondNorm, In:IT.Ori, In:CGM_WM.dot)
In:Total.blur1=Blur(In:Total.mag)
In:Total.blur2=Blur(In:Total.blur1)

III.b. Outer Cortical Boundary
Out:IT=ClassifyIT(I.Resamp, Out:ITmean, OutIT)
Out:IT.ori=Orient(Out.IT)
Out:Near2In.ori=Near2Planes (In:Total.vec, delta=3, gradflag=away, absflag=0, downflag=1)
Out: NearIn_OutIT.ori=Near1At1Plane (In:Total.vec, Out:IT.ori_grad, delta=3, ingradflag=+1, outgradflag=0, downflag=1)
Out:NearIn_OutIT.sqrt.ori=CombineVectors(sqrt, Out: NearIn_OutIT.ori)
Out:Total.ori=Combine(Out:Near2In.ori, Out:NearIn_OutIT.sqrt.ori)
Out:Total.blur1=Blur(Out:Total.mag)
Out:Total.blur2=Blur(Out:Total.blur1)
Out:Total.blur3=Blur(Out:Total.blur2)

III.c. Combination Measures
InOutDiff.mag=Combine(diffratio,In:Total.blur2, Out:Total.blur3, WM.thresh))

Stage IV. Generate Initial Surface

IV.a. Initial Segmentation
InOutDiff.Thresh=Thresh(InOutDiff.mag, n)=threshold level that reliably runs in between inner and outer surfaces of cortex.

IV.b. Topologically Correct Segmentation
Inspect InOutDiff.thresh for topological correctness, looking for incorrect fusion across apposed banks of a sulcus and for incorrect holes in white matter under a gyrus.

If known or suspected topological errors are identified, correct them using PatchMorphOps and PasteMorphOps operations at the relevant locations in the volume.
InOutDiff.flood=FloodFill(InOutDiff.patch.n)

IV.c. Initial Surface Generation

Run Marching Cubes on InOutDiff.flood={Initial Surface}

B. Cortical Surface Generation with Concomitant Subcortical Segmentation

Stage I

I.a. Renormalizing and Conditioning the Image Data

Designate the raw input image as I.raw

I.renorm=Renormalize (I.raw)

I.Resamp=Interpolate(I.renorm)

I.b. Determine Inner and Outer Masks (Skip—In this Sequence, Masks are Generated at the End of Stage II)

I.c. Determine Parameter Values for Cortical Segmentation

Set parameters needed for generating inner and outer boundaries. These include the peak, upper and lower standard deviations for WM, GM, In:IT, Out:IT (based on interactive assessment of intensity histogram and of selected characterstics of cortex in the image volume); plus the standard deviations (narrow and wide axes) for filters, plus spatial offsets (based mainly on cortical dimensions relative to sampling density)

Stage II. Subcortical Segmenation and Generation of Inner and Outer Masks

II.a. Determine Parameter Values for Subcortical Segmentation

These include the stereotaxic coordinates of various neuroanatomical landmarks visible in the image volume (used for various seeds and mask limits); plus threshold values for white matter (regular and high thresholds), gray matter, choroid plexus, and CSF; plus intensity values for inner and outer boundary maps.

II.b. Segment Identified Structures and Regions

These include white matter, lateral ventricle, basal ganglia, blood vessels, corpus callosum, brainstem, hippocampus, amygdala, and the retrobulbar region behind eyeball.

Generate segmentations of each structure de novo from the hemisphere of interest, using the steps outlined below or a sequence achieving a similar outcome. Alternatively, use as a guide the shape of the corresponding structure in a previously segmented atlas after it has been transformed to the hemisphere of interest by an available stereotaxic registration method. Apply appropriate logical operations and shape-modifying operations within the available library to reshape the atlas segmentation so that it conforms in shape and location to the corresponding structure in the hemisphere of interest.

Generate a composite segmentation of cerebral white matter plus all subcortical structures that adjoin neocortex (CerebralWM_subcort), plus a segmentation (Subcort.Coremask) that includes a central core of white matter and gray matter structures underlying cerebral cortex but only near the midline.

Specific Processing Steps

Tabulation of specific processing steps that can be used for subcortical segmentation:

```
RESAMPLE
I.resamp = InterpVolume(InitialIntensityVolume)
WHITE.MATTER/
WM.thresh = Thresh (I.resamp, WMthresh)
WM.HighThresh = Thresh (I.resamp, WMhighThresh)
WM.thresh.dilate = Dilate(WM.thresh, 1)
VENTRICLE/
Ventricle.thresh = InvertThresh(I.resamp, VentricleThresh)
CSF_OutIT_ChorPlex.thresh = InvertThresh(I.resamp, ChorPlexThresh)
Ventricle.flood = FloodFill(Ventricle.thresh)
    [VentricleSeed; VentricleMask = 'ACPCx + 8' ncol 0 CCant
    ACz CCdors]
Ventricle_NotWM.sculpt = Sculpt_AndNot(Ventricle.flood, WM.thresh, 6)
CSF_OutIT_NotNearVentricle =
    CombineVols_AndNot(CSF_OutIT_ChorPlex.thresh,
    Ventricle_NotWM.sculpt)
CSF_OutIT_NotNearVentricle.flood = FloodFill(CSF_OutIT_NotNearVentricle
    CSFSeed)
CSF_OutIT.dilate = Dilate(CSF_OutIT_NotNearVentricle.flood, 6)
Ventricle_ChorPlex_NotNearCSF =
    CombineVols_AndNot(Ventricle_NotWM.sculpt, CSF_OutIT.dilate)
Ventricle_CSFchorPlex.sculpt =
    Sculpt_And(Ventricle_ChorPlex_NotNearCSF,
    CSF_OutIT_ChorPlex.thresh, 12)
Ventricle_ChorPlex.dilate = Dilate(Ventricle_CSFchorPlex.sculpt, 3)
Ventricle.thresh.dilate = Dilate(Ventricle.thresh, 2)
Ventricle.CCmask = MaskVol(Ventricle_ChorPlex_NotNearCSF
    [CCmask = 0   'BGlat - 20'   CCpost CCand CCvent CCdors]
BASAL.GANGLIA
BGGM.Thresh = InvertThresh(Case.resamp, BGThresh)
BGGM_NotNearCSF = CombineVols_AndNot(BGGM.Thresh, CSF_OutIT.dilate)
BGGM_NotNearCSF_orVentricle = CombineVols_Or(BGGM_NotNearCSF,
    Ventricle_ChorPlex_NotNearCSF)
BG.sphere = MakeSphere(BasalGangliaSeed, BGradius = 50)
BGGM_inSphere = CombineVols_And(BG.sphere, BGGM_NotNearCSF_orVentricle)
BasalGanglia.flood = FloodFill(NearBG_NotWMVentricleNearCSF;
    [BGseed; mask = ACx + 16 BGlat CCpost CCant BGventral +12
    CCdors]
```

-continued

```
BasalGangliasculpt = Sculpt_And(BasalGanglia.flood, BGGM.Thresh, 5
    [BGmask = 0 BGlat CCpost CCant BGventral CCdors]
BasalGanglia.sculptDilErode = DilateErode(BasalGanglia.sculpt, 2, 2)
BG.smearVent = SmearAxis(BG.dilateErode, 0 10 1 0)
BG.smearVent.med2BGmask = MaskVol(BG.smearVent)
    [MedialToBGmask = 'BGlat – 20'  ncol CCPost OrbitoFrontalPost
    BGVentral CCdors]
VESSELS_CAROTID
Carotid.thresh = Thresh(Case.Resamp, CarotidThresh)
Carotid.flood = FloodFill(CarotidThresh, CarotidSeed)
Carotid.2.flood = FloodFill(Carotid.Thresh, Carotid2Seed)
Carotid.both = CombineVols_Or(Carotid.flood, Carotid.2.flood)
Carotid.sculpt = Sculpt_And(Carotid.both, WM.thresh, 2)
CORPUS.CALLOSUM/
CC.slice = SliceFill(WM.thresh)
    [CCseed, CCsliceMask = CCSeedX CCSeedX+1 CCpost CCant
    CCventral CCdors]
CC.sculpt = Sculpt_And(CC.slice, WM.thresh, 10)
CC.smearLat = SmearAxis(CC.slice, X = 0, 35, –1, 1)
CC_AndBelow = SmearAxis(CC.smearLat, Z = 2, 35, –1, 1)
BelowCC_noGenu = MaskVol(CC.smearLatVent)
    [BelowCCnoGenuMask = 'BGlat – 20'  ncol CCpost CCgenuPost
    CCventral CCdors]
CC_AndBelow.notFrontal = MaskVol(CC_AndBelow)
    [MedToBGmask = 'BGlat – 20'  ncol CCPost OrbitoFrontalPost
    BGVentral CCdors]
CC_AndFarBelow.notFrontal = SmearAxis(CC_AndBelow.notFrontal, 2 30
    –1 1)
CC.sculpt.smearLat = SmearAxis(CC.sculpt 0 3 –1 1)
CC.sculpt.smearMed = SmearAxis(CC.sculpt, 0 2 1 1)
BRAINSTEM
Brainstem.sphere = MakeSphere(BrainstemSeed, BrainstemRadius = 40)
Brainstem.WMhighThresh.core = CombineVols_And(Brainstem.sphere,
    WM.highThresh
Brainstem.WMhighThresh.core_noCarotid =
    CombineVols_AndNot(Brainstem.WMhighThresh.core, Carotid. sculpt)
Brainstem.WMhighThresh.core_noCarotid_notBelowCC =
    CombineVols_AndNot(Brainstem.WMhighThresh.core_noCarotid,
    BelowCC_noGenu)
Brainstem.WMhighThresh_noCarotid_notBelowCC.flood =
    FloodFill(Brainstem.WMhighThresh.core_noCarotid_notBelowCC)
Brainstem =
    Sculpt_And(Brainstem.WMhighThresh_noCarotid_notBelowCC.flood,
    WM.thresh, 10)
Brainstem.smallSphere = MakeSphere(BrainstemSeed, BrainstemSmallRadius =
    30)
Brainstem.shell = CombineVols_AndNot(Branstem, Brainstem. smallSphere)
Brainstem.shell.mask = MaskVol(Brainstem.shell) mask = 0 ncol
    0 nrow BrainstemSeedZ nslice]
CEREBRAL WM_SUBCORT
WM.highThresh_noBrainstem = CombineVols_AndNot(WM.highThresh,
    Brainstem)
WM.highThresh_noBrainstem_noCarotid =
    CombineVols_AndNot(WM.highThresh_NoBrainstem, Carotid. sculpt)
WM.highThresh.Cerebral.flood =
    FloodFill(WM.highThresh_noBrainstem_noCarotid, WMSeed)
WM.thresh_cerebral = Sculpt_And(WM.highThresh.Cerebral.flood,
    WM.thresh, 12)
WM_BG = CombineVols_Or(WM.thresh_cerebral, BasalGanglia.sculpt)
WM_Ventricle_BG = CombineVols_Or(WM_BG, Ventricle_ChorPlex_NotNearCSF)
WM_Ventricle_BG_NoBrainstem = CombineVols_AndNot(WM_Ventricle_BG,
    Brainstem)
CerebralWM_Ventricle_BG =
    CombineVols_AndNot(WM_Ventricle_BG_NoBrainstem, Carotid.sculpt
HIPPO.AMYGDALA
CerebralWM_Ventricle_BG.mask = MaskVol(CerebralWM_Ventricle_BG)
    [MedTempMask = 0 HCamygdalaLat CCpost AmygdalaAnt
    HCamygdalaVent SpleniumVent]
CCpost AmygdalaAnt HCamygdalaVent SpleniumVent)
CerebralWM_subcort.SmearMedial =
    SmearAxis(CerebralWM_Ventricle_BG.mask, 0, 1, 1, 0)
CerebralWM_subcort.SmearDorsal =
    SmearAxis(CerebralWM_Ventricle_BG.mask, 2, 15, 1, 1)
CerebralWM_subcort.SmearDorsalVentral =
    SmearAxis(CerebralWM_subcort.SmearDorsal, 2, 8, –1, 1)
MedialGyralTips = CombineVols_AndNot(CerebralWM_subcort.SmearMedial,
    CerebralWM_subcort.SmearDorsalVentral)
```

-continued

```
MedialGyralTips.smearMed = SmearAxis(MedialGyralTips, 0, 4, 1, 1)
MedialGyralTips.smearMedVent = SmearAxis(MedialGyralTips.smearMed, 2,
    4, -1 1)
MedialGyralTips.smearMedVentDilErode =
    DilateErode(MedialGyralTips.smearMedVent, 2, 1)
MedialTempShelf.flood = FloodFill(MedialGyralTips.smearMedVentDilErode)
    [MedTempWMSeed; MedTempMask]
Amygdala.shelf.flood = FloodFill(MedialGyralTips.smearMedVentDilErode)
    [AmygdalaShelfSeed; AmygdalaMask = 0 HCamygdalaLat
    AmygdalaPost AmygdalaAnt HCamygdalaVent SpleniumVent)
Amygdala.shelf.smearAnt = SmearAxis(Amygdala.shelf.flood, 1, 10, -1,
    1)
MedialTemp_Amyg.shelf = CombineVols_OR(Amygdala.shelf.smearAnt,
    MedialTempShelf.flood)
MedialTempShelf.smearMed = SmearAxis(MedialTemp_Amyg.shelf, 0, 10, 1,
    1)
MedialTempShelf.smearMedLat = SmearAxis(MedialTempShelf.smearMed, 0, 1,
    -1, 1)
MedialTemporalShelf.MedEdge = SmearAxis(MedTempShelf.smearMed, 0, 1, 1,
    0)
MedialTemporalShelf.MedEdge.smearMed = SmearAxis(MedTempShelf.MedEdge,
    0, 5, 1, 1)
MedialTemporalShelf.MedEdge.smearMedDilErode =
    DilateErode(MedialTemporalShelf.MedEdge.smearMed, 2, 1)
TemporalShelfEdge.smearDorsal =
    SmearAxis(MedialTemporalShelf.MedEdge.smearMedDilErode,
    2, 50, 1, 1)
MedialTempShelf_TemporalShelfEdge.smearDorsal =
    CombineVols_Or(TemporalShelfEdge.smearDorsal,
    MedialTempShelf.smearMedLat)
MedialGyralTips.smearMed.clear =
    CombineVols_AndNot(MedialGyralTips.smearMed,
    CerebralWM_subcort.SmearDorsVent)
FullTemporalBarrier = CombineVols_Or(MedialGyralTips.smearMed.clear,
    MedialTempShelf_TemporalShelfEdge.smearDorsal)
FullTemporalBarrier_CerebralWM_Ventricle_BG.mask =
    CombineVols_Or(FullTemporalBarrier, CerebralWM_Ventricle_BG.mask
BG.DilErode.smearLat = SmearAxis(BasalGanglia.sculpt.DilErode, 0 40 -1,
    1)
GM.thresh = DualThresh(Case.resamp, GMthreshLow, GMthreshHigh)
GM_notCerebralWM_Ventricle_BG.mask = CombineVols_AndNot(GM.thresh,
    CerebralWM_Ventricle_BG.mask)
GM_notCerebralWM_Vent_BG_LatToBG =
    CombineVols_AndNot(GM_not CerebralWM_Ventricle_BG.mask,
    BG.DilErode.smearLat )
GM_notCerebralWM_Vent_BG_LatToBG_notTempBarrier =
    CombineVols_AndNot(GM_notCerebralWM_ Vent_BG_LatToBG,
    FullTemporalBarrier)
GM_notNearWM_notTempBarrier =
    CombineVols_AndNot(GM_notCerebralWM_Vent_BG_LatToBG_notTempBarrier,
    WM.thresh.dilate)
GM_notNearWM_notTempBarrier_notNearCSF =
    CombineVols_AndNot(GM_notNearWM_notTempBarrier,
    Ventricle.thresh.dilate)
GM notNearWM_notTempBarrier_notNearCSF_orVentCP =
    CombineVols_AndNot(GM_notNearWM_notTempBarrier_notNearCSF,
    Ventricle_ChorPlex.dilate)
Hippo.core = FloodFill(GM_notNearWM_notTempBarrier_notNearCSF_orVentCP)
    [HippoSeed; HippoMask = 0 HCamygdalaLat CCpost
    AmygdalaPost HCamydalaVent SpleniumVent]
Amygdala.core =
    FloodFill(GM_notNearWM_notTempBarrier_notNearCSF_orVentCP)
    [AmygdalaSeed; AmygdalaMask = 0 HCamygdalaLat AmygdalaPost
    AmygdalaAnt HCamygdalaVent SpleniumVent]
HippoAmyg.core = CombineVols_Or(Hippo.core, Amygdala.core)
HippoAmyg.sculpt = Sculpt_AndNot(HippoAmyg.core,
    CSF_OutIT_ChorPlex.thresh, 3)
HippoAmyg.core.sculpt_noWM = CombineVols_AndNot(HippoAmyg.core.sculpt,
    WM.cerebral.flood)
HippoAmyg.sculpt_noWM_noTempBarrier =
    CombineVols_AndNot(HippoAmyg.core.sculpt_noWM,
    FullTemporalBarrier)
HippoAmyg.sculpt_noWM_noTempBarrier.flood =
    FloodFill(HippoAmyg.core.sculpt_noWM_noTempBarrier)
    [HCamygdalaSeed, MedialTemporalMask = 0 HCamygdalaLat CCpost
    AmygdalaAnt HCamygdalaVent SpleniumVent]
Hippo_Amygdala = DilateErode(HippoAmyg.sculpt_noWM_noTempBarrier.flood,
    2, 2)
```

-continued

```
HippoAmyg.smearVent = SmearAxis(Hippo_Amygdala 2, 10, -1, 1)
THALAMUS
GM_WM.belowCC = CombineVols.AndNot(BelowCC_noGenu,
    CSF_OutIT_ChorPlex.thresh)
GMbelowCC_notBG = CombineVols_AndNot(GM_WM.belowCC, WM_Ventricle_BG)
CC_Brainstem = CombineVols_Or(CC.sculpt, Brainstem)
CC_Brainstem.dilate = Dilate(CC_Brainstem, 4)
GMbelowCC_notBG_notNearCCbrainstem =
    CombineVols_AndNot(GMbelowCC_notBG, CC_Brainstem.dilate)
Thalamus.core = CombineVols.AndNot(GMbelowCC_notBG_notNearCCbrainstem,
    Hippo_Amygdala)
Thalamus = DilateErode(Thalamus.core, 2, 1)
SUBCORTICAL.CORE
CerebralWM_Vent_BG.subCCcore =
    CombineVols_And(CC_AndFarBelow.notFrontal,
    CerebralWM_Ventricle_BG)
CerebralWM_Vent_BG.subCC_aboveHC =
    CombineVols_AndNot(CerebralWM_Vent_BG.subCCcore,
    HippoAmyg.smearVent)
CerebralWM_Vent_BG.subCC_aboveHC.flood =
    FloodFill(CerebralWM_Vent_BG.subCC_aboveHC, CCSeed, FullMask)
Subcort.core_noHCamyg = CombineVols_Or(BG.smearVent.med2BGmask,
    CerebralWM_Vent_ BG.subCC_above HC.flood)
Subcort.core_CC_noHCamyg = CombineVols_Or(Subcort.core_noHCamyg,
    CC.sculpt.smearLat)
Subcort.core_CC_Thal_noHCamyg =
    CombineVols_Or(Subcort.core_CC_noHCamyg, Thalamus)
Subcort.core_CC_Thal_noHCamyg.smearMed =
    SmearAxis(Subcort.core_CC_Thal_noHCamyg, 0 10 1 1)
Subcort.core_CC_Thal_Vent_noHCamyg = CombineVols_Or(Ventricle.CCmask,
    Subcort.core_CC_Thal_noHCamyg.smearMed)
Subcort.CoreMask = CombineVols_Or(Subcort.core_CC_Thal_Vent_noHCamyg,
    Hippo_Amygdala)
EYE
Eye.sphere = MakeSphere(EyeSeed, 70)
EyeSphere_WMhighThresh = CombineVols_And(Eye.sphere, WM.highThresh)
EyeSphere_WMhighThresh.flood = FloodFill(EyeSphere_WMhighThresh,
    EyeSeed)
EyeSphere_WMhighThresh.sculpt =
    Sculpt_And(EyeSphere_WMhighThresh.flood, WM.thresh)
EyeFat.DilateErode = DilateErode(EyeSphere_WMhighThresh.sculpt, 2 1)
CEREBRAL.WM_SUBCORT.2
CerebralWM_Ventricle_BG_Thalamus =
    CombineVols_Or(CerebralWM_Ventricle_BG, Thalamus)
CerebralWM_Ventricle_BG_Thalamus_HCamyg =
    CombineVols_Or(CerebralWM_Ventricle_BG_Thalamus,
    HippocampusAmygdala.sculptDilErode)
CerebralWM_Ventricle_BG_Thalamus_HCamyg_ventMed2BG =
    CombineVols_Or(BG.smearVent.med2BGmask,
    CerebralWM_Ventricle_BG_Thalamus_HCamyg)
CerebralWM_Ventricle_BG_Thalamus_HCamyg_ventMed2BG_BstemShell =
    CombineVols_Or(Brainstem. shell.mask,
    CerebralWM_Ventricle_BG_Thalamus_HCamyg_ventMed2BG
CerebralWM_subcort =
    CombineVols_AndNot(CerebralWM_Ventricle_BG_Thalamus_HCamyg_ventMe
    d2BG_BstemShell, EyeFat.DilErode)
CerebralWM_subcort.flood = FloodFill(CerebralWM_subcort, WMseed,
    FullMask)
CerebralWM_subcort.fill = FillHoles(CerebralWM_subcort.flood)
CerebralWM_subcort_noCC = CombineVols_AndNot(CerebralWM_subcoret.fill,
    CC.sculpt.smearMed)
CerebralWM_subcort_noCC.shell = MakeShell(CerebralWM_subcort_noCC, 0 2)
CerebralWMshell_noSubcortCoreMask =
    CombineVols_AndNot(CerebralWM_subcort_noCC.shell,
    Subcort.CoreMask)
CerebralWMshell_noSubcortCoreMask.flood =
    FloodFill(CerebralWMshell_noSubcortCoreMask,
    WMbelowCortexShellSeed)
NotBelowCortex.shell =
    CombineVols_AndNot(CerebralWM_subcort_noCC.shell,
    CerebralWMshell_no SubcortCoreMask.flood
INNER.MASK
WM_subcort.shell = MakeShell(CerebralWM_subcort_noCC, DilateNum = 4,
    ErodeNum = 5)
WM_SubcortShell.NoEye = CombineVols_AndNot(WM_subcort.shell,
    EyeFat.DilateErode)
NotBelowCortex.shell.dilate = Dilate(NotBelowCortex.shell, 1)
```

```
WM_subcortShell_notMedialShell =
    CombineVols_AndNot(WM_subcortShell.noEye,
    NotBelowCortex.shell.dilate)
InnerMask = CombineVols_AndNot(CerebralWM_subcort_noCC.shell,
    Subcort.CoreMask)
OUTER.MASK
OuterShell = MakeShell(CerebralWM_subcort_noCC, 12, 2)
OuterMask = CombineVols_AndNot(OuterShell, Subcort.CoreMask)
Stage III. Probabilistic representations of cortical structure.
INNER.BOUNDARY
GM:ILevel = ClassifyIT(I.resamp)
GM.grad.vec = Grad(GM:ILevel)
WM:ILevel = ClassifyIT(I.resamp)
WM.grad.vec = Grad(WM:ILevel)
In:CGM_WM.dot.vec = CombineVectors(dotsqrt.Rect.Minus_SecondNorm,
    WM.grad.vec, GM.grad.vec, InnerMask)
In:IT.mag = ClassifyIT(I.resamp, InIT)
In:IT.ori.vec = Orient(In:IT.mag, InnerMask) [In:IT.grad.vec =
    Grad(In:IT.mag); In:IT.ori.vec = Near2Planes(In:IT.grad.vec,
    InnerMask)]
In:Total.vec = CombineVectors(2vec_SecondNorm, In:IT.grad.vec,
    In:CGM_WM.dot.vec, InnerMask)
In:Total.vec.channel4 = ViewVector(In:Total.vec)
In:Total.blur1.mag = Blur(In:Total.vec.channel4)
In:Total.blur2.mag = Blur(In:Total.blur1.mag)
OUTER.BOUNDARY
Out:IT.mag = ClassifyIT(I.resamp)
Out:IT.ori.vec = Orient(Out:IT.mag, OuterMask) [Out:IT.grad.vec =
    Grad(Out:IT.mag); Out:IT.ori.vec = Near2Planes(Out:IT.grad.vec,
    OuterMask)]
Out:NearIn_OutIT.ori = Near1At1Plane(In:Total.vec, Out:IT.ori,
    OuterMask)
Out:NearIn_OutIT.sqrt.ori = CombineVectors(sqrt, replacemag,
    Out:NearIn_OutIT.ori)
Out:Near2In.ori = Near2Planes(In:Total.vec, OuterMask)
Out:Total.vec = CombineVectors(2vec, Out:NearIn_OutIT.sqrt.ori,
    Out:Near2In.ori)
Out:Total.blur1 = Blur(Out:Total.vec.channel4)
Out:Total.blur2 = Blur(Out:Total.blur1.mag)
Out:Total.blur3 = Blur(Out:Total.blur2.mag)
RADIAL.POSITION.MAP
CerebralWM_subcort_noCC.erode = Erode(CerebralWM_subcort_noCC, 2)
CerebralWM.erode_subcort.core =
    CombineVols_Or(CerebralWM_subcort_noCC.erode, Subcort.CoreMask)
InOutDiff.mag = CombineVols(diffratio, In:Total.blur2.mag,
    Out:Total.blur3, CerebralWMerode_subcortCore)
InOutDiff.thresh.composite = Thresh(InOutDiff.mag, Thresh = 70, 90,
    110, 130, 150, 170, 190, 210)
InOutDiffThresh = interactively determined best threshold value.
Stage IV. Initial segmentation and surface reconstruction.
IV.a. Initial segmentation.
InOutDiff.thresh = Thresh(InOutDiff.mag, InOutDiffThresh)
IV.b. Topologically correct segmentation.
InOutDiff.paste.n = PasteVols(InOutIDiff.thresh,
    InOutDiff.thresh.composite.m; PasteCenterX,Y,Z; PasteDimX,Y,Z)
InOutDiff.paste.patch.n = PatchMorphOps(InOutDiff.paste.n, dilatenum,
erodenum, CenterX,Y,Z; MaskDimX,Y,Z)
InOutDiff.flood = FloodFill(InOutDiff.paste.patch.n,
    BasalGangliaFloodSeed)
IV.c. Identification of cortical and non-cortical voxels.
CORTICAL.SHELL
InOutDiff.shell = MakeShell(InOutDiff.patch.flood, 0, 2)
InOutDiff.shell.noCC = CombineVols_AndNot(InOutDiff.shell, CC.sculpt)
InOutDiff.shell.noCCorBelowCC =
    CombineVols_AndNot(InOutDiff.shell.noCC, CC.sculpt)
Brainstem.dilate = Dilate(Brainstem, 2)
InOutDiff.shell.noCC_noBrainstem =
    CombineVols_AndNot(InOutDiff.shell.noCCorBelowCC,
    Brainstem.dilate)
Amygdala.core.smearMedial = SmearAxis (Amygdala.core.raw 0 10 1 1)
InOutDiff.shell.noCC_noBrainstem_noAmygSmearMed =
    CombineVols_AndNot(nOutDiff.shell.noCC_no Brainstem.raw,
    Amygdala.core.smearMedial.raw)
InOutDiff.shell.CGM =
    CombineVols_AndNot(InOutDiff.shell.noCC_noBrainstem_noAmygSmearMed,
    NotBelowCortex.shell)
```

-continued

```
InOutDiff.shell.CGM.flood
    FloodFill(InOutDiff.shell.CGM,CorticalShellSeed)
InOutDiff.shell.NonCGM = CombineVols_AndNot(InOutDiff.shell,
    InOutDiff.shell.CGM.flood)
```

Stage IV.d. Initial Surface Generation

```
Run Marching Cubes on InOutDiff.patch.flood = Total
Surface = {TS.1}
If node is within InOutDiff.shell.CGM.flood, assign it as
CGM+, else = CGM-.Delete (disconnect) all nodes that are
CGM -, leaving surface {CS.1}
Do Euler check, inspect surfaces.
{CS.1}hs = SurfSmooth({CS.1}) Hyper-smooth the surface
until it is entirely convex.
{CS.1}sphere = SphereProject({CS.1}hs) Project the
surface to a spherical configuration.
{CS.1}sphere.LD = SphereMorph({CS.1}sphere) Reduce
distortions by multi-resolution morphing on the sphere.
{CS.1.Res}sphere = Resampled surface in spherical
configuration.
Classify resampled nodes as CGM+, CGM-
{CS.1.Res}3D = 3Dproject({CS.1.Res}sphere) Project
resampled surface back to sphere.
{FICS} = SurfSmooth({CS.1.Res}3D, CGM-) Smooth only CGM-
nodes, holding CGM+ fixed.
```

Stage V. (Applicable After Processing by Section A or Section B Above). Generate refined Inner and Outer Masks and Boundaries MASKS.REFINED
InnerMask.inside=CombineVols_AndNot(InnerMask, InOutDiff.patch.flood)
InnerMask.inside.dilate=Dilate(InnerMask.inside, 1)
OuterMask.outside=CombineVols_AndNot(OuterMask, InOutDiff.patch.flood)
OuterMask.outside.dilate=Dilate(OuterMask.outside, 1)

INNER_BOUNDARY.REFINED
I.grad.InMask=CombineVols(mult, I.grad.mag, InMask.inside.dilate)
In:Total.refine.vec=CombineVectors(2vec_SecondNorm, In:IT.ori.vec, I.grad.InMask)
In:Total.refine.blur1=Blur(In:Total.refine.mag)

OUTER_BOUNDARY.REFINED
Out:Near In_OutIT.ori.refine=Near1At1Plane (In:Total.refine.vec, Out:IT.ori OuterMask.outside.dilate)
Out:NearIn_OutIT.sqrt.ori.refine=CombineVectors(sqrt, replacemag, Out:NearIn_OutIT.ori.refine)
Out:Near2In.ori.refine=Near2Planes(In:Total.refine.vec, OuterMask.outside.dilate)
Out:Total.refine.vec=CombineVectors(2vec, Out:NearIn_OutIT.sqrt.ori.refine, Out:Near2In.ori.refine)
Out:Total.refine.blur1=Blur(Out:Total.refine.mag)

Stage VI. Generate Full Cortical Surface Model and Characterize its Differential Geometry. (Applicable After Processing by Section A or Section B Above)

VI.a. Generate Full Cortical Surface Model
{ICS}3Dinit=GradFlow({FICS}, In:Total, +OutInGrad) Generate initial inner surface by driving {FICS} along positive direction of the InOutGrad vector field towards the representation of the outer boundary.

{ICS}3D=RidgeFit({ICS}3Dinit, In:Total) Generate final inner surface by fitting a gaussian ridge to the inner boundary data.

{OCS}3Dinit=GradFlow({FICS}, Out:Total, −OutInGrad) Generate initial outer surface by driving {FICS} along negative direction of the OutInGrad vector field towards the representation of the outer boundary.

{OCS}3D=RidgeFit({OCS}3Dinit, Out:Total) Generate final outer surface by fitting a gaussian ridge to the outer boundary data.

{MS}=SplitPrismoid({ICS}3D, {OCS}3D) Tiling that creates equal volume above and below middle surface.

{EdgeS}=ribbon-like surface along the termination of cortex, containing only edge nodes and extending from inner to outer surface.

{MS}sphere=SphereProject({MS}hs) Project the hyper-smoothed middle surface to a spherical configuration.

{MS}sphere.LD=SphereMorph({CS.1}sphere) Reduce distortions by multi-resolution morphing on the sphere.

{MS.Resamp}sphere, resample ({MS}sphere, LD)
{MS.Resamp}3D, resampled ({MS}sphere, LD, r)

VI.b. Tensor Field Characterization of Cortical Differential Geometry

OutInGrad.norm=(OutInGrad.normx, OutInGrad.normy, OutInGrad.normz)
GradOutInGradx=Gradfil7*(OutInGrad.normx)
GradOutInGrady=Gradfil7*(OutInGrad.normy)
GradOutInGradz=Gradfil7*(OutInGrad.normz)

This forms a 3×3 matrix of information about gradients in the vector field of unit normals, which themselves are an estimate of the radial axis of the cortex. Diagonalize this matrix and use the matrix values to describe the differential geometry of the cortical volume along its natural coordinate system of a radial dimension (r) and two tangential dimensions (e.g., spherical coordinates( ) as described in Section A). This includes estimates of the two principal curvatures at each point, the average of the principal curvatures (mean curvature, a measure of folding), and the product of the principal curvatures (intrinsic curvature).

APPENDIX 4

Conventions, Terms, and Library of Operations
1. Library of Voxel Transformation Operations Intensity Transformation for classification probabilities:
ClassifyIT(I, Ipeak, Ilow, Ihigh, signum)=$\exp(-(I-Ipeak)^2/2(\sigma lo)^2)$ if I<Ipeak, where $\sigma lo=(Ipeak-Ilow)/signum$
else=$\exp(-(I-Ipeak)^2/2(\sigma hi)^2)$, where $\sigma hi=(Ihigh-Ipeak)/signum$
Thresh(volume, threshlevel): threshold a volume (if I<threshlevel, I=0, else I=255)
InvertThresh(volume, threshlevel): threshold a volume (if I>threshlevel, I=0, else I=255)
Rectify
FloodFill(volume, seedvox): flood fill a binarized volume from a selected seed.

MakeShell(vol, dilatenum, erodenum): make a shell around boundary of a binary volume by a combination of dilation (dilatenum) or erosion (erodenum).

Dilate=VolMorphOps (vol, dilatenum, 0): add (dilate) voxels to a binary volume, by a specified number of steps (dilatenum); leaves the core still present.

Erode=VolMorphOps (vol, 0, erodenum): erode voxels from a binary volume, by a specified number of steps (erodenum); leaves the core still present DilateErode=VolMorphOps (vol, dilatenum, erodenum): add (dilate) voxels to a binary volume, by a specified number of steps (dilatenum), then subtract by erodenum steps; leaves the core still present.

PatchMorphOps (vol, outvol, dilatenum, erodenum, PatchCenterX, PatchCenterY, PatchCenterZ, PatchDimX, PatchDimY, PatchDimX): outvol=result of dilation then erosion (regular VolMorphOps) within box centered at PatchCenterX,Y,Z and having dimensions PatchDimX, PatchDimY, PatchDimX; else outvol=vol1.

FillHoles(vol.bin): remove internal holes from a flood-filled volume by combining a flood-filling of the inverted exterior of the volume with the original flood-fill, identifying non-filled voxels (holes) and reassigning them to be part of the original flood-fill.

OrientNormal_zplus(vec): nx=sgn(nz)nx; ny=sgn(nz)ny; nz=|nz|

Sqrt (volume): out=sqrt(volume)

MaskVol ncol nrow nslice involume outvolume MaskList= xmin, xmax, ymin, ymax, zmin, zmax): vol=0 if outside mask SmearAxis invol outvol shiftmag shiftsign shift axis coreflag Shifts a volume positively (if shiftsign=1) or negatively (if shiftsign=−1) by a magnitude shiftmag along the specified axis (x=0,y=1,z=2) It leaves the original core volume if coreflag=1, else removes the core if coreflag=0

FindLimits ncol nrow nslice invol outname finds xmin, xmax, ymin, ymax, zmin, zmax and stores them as $outname.xmin, $outname.xmax, etc.

2. Combination Operations on Multiple Volumes (Operations are applied voxel-by-voxel to values in each volume and are always normalized to a minimum of zero and a maximum of 255 unless explcitly stated othewise)

3. Combinations of Scalar Volumes

CombineVols(add, vol1, vol2): output=vol1+vol2
Combine Vols (subtract, vol1, vol2): output=vol1−vol2
Combine Vols (mult, vol 1, vol2): output=(vol1)(vol2)
Combine Vols (divide, vol1, vol2, denomfactor)=(vol1)/(vol2+denomfactor)
CombineVols (AndNot, vol1, vol2)=Rectify(vol1−vol2)
Combine Vols(max, vol1, vol2): output=max(vol1, vol2)
Combine Vols(OR, vol1, vol2): If vol1or vol2 >0, output= 255, else output=0.
Combine Vols (sqrt, vol1, vol2)=sqrt((vol1)(vol2))
CombineVols(diffratio, vol1, vol2, vol3) if vol3=255, out=1. denom=vol1+vol2; if denom=0, out=−1, else out=(vol1−vol2)/denom Sculpt (And, vol1.bin, vol2.bin, outvol.bin, stepnum): Expands vol1by stepwise dilation of 1 voxel, but includes only dilation voxels that *are* part of vol2 before proceeding to the next iteration. Total iterations=stepnum.

Sculpt (AndNot, vol1.bin, vol2.bin, outvol.bin, stepnum): Expands vol1by stepwise dilation of 1 voxel, but includes only dilation voxels that *are not* part of vol2 before proceeding to the next iteration. Total iterations=stepnum.

SetVolLevels (vol1.bin, vol2.bin, outvol, level1, level2, level3): Outvol=0 of vol1=vol2=0. Outvol=level1 if vol1=255, vol2=0. Outvol=level2 if vol1=0, vol2=255.

Paste Vols (vol1, vol2, outvol, PasteCenterX, PasteCenterY, PasteCenterZ, PasteDimX, PasteDimY, PasteDimX): outvol1=vol2 if within box defined by PasteCenter+/−PasteDimX, PasteDimY, PasteDimX; else outvol=vol1.

4. Combine Vector Volumes

CombineVectors(dot, vol1, vol2)=vol1.vol2
CombineVectors(dotnormsquare vol1, vol2)=vol1.$vol_2)^2$
CombineVectors(subtractnorm, vol1, vol2)=vol1−vol2)
CombineVectors(dotsqrtrectminus, vol1, vol2)=sqrt(Rectify ((−vol1).(vol2)))
CombineVectors(dotsqrtrectplus, vol1, vol2)=sqrt(Rectify ((vol1).(vol2)))
CombineVeVol((replacemag, vol1.mag, vol2.norm)= (vol1.mag, vol2.norm)
Combine Vectors(2vecSecondNorm, vol1, vol2): mag=max (vol1.mag, vol2.mag), norm=vol2.norm 5. Filter Profiles and Convolution-related Operations 5.1 Low Pass Filters Gaussian: Blur($\sigma$blur)=exp($-(r^2/\sigma blur^2)$))
Separable: BluFfil7=hfiln[x]*(hfiln[y]*(hfiln[z]*I))) for n=5, hfiln=[1/16, 1/4, 3/8, 1/4, 1/16]
Laplace.5*(I)=I−Blurfil.n*I hfil.5=[1/16, 1/4, −1/8, 1/4, 1/16]
Asymmetric (gradient) filters Gradfil.5=[gfilxn,gfilyn, gfilzn] gfilxn=(x hfiln[x], hfiln[y], hfiln[z]) etc.

5.2 Symmetric Filters

Cosine-modulated gaussian (CMG) at angle alpha
Cosinefila=cos(k$\alpha$.r); Blur ($\sigma$CMG)
Ellipsoidal filters:
(Efil)=exp($-(x^2+y^2)/\sigma wide^2$)exp($-(z^2)/\sigma narrow^2$)
Efil$\alpha$=Efil rotated by angle nalpha
Planar ellipsoid: PEfil($\sigma$xy,$\sigma$z); ($\sigma$xy>$\sigma$z)
Displaced ellipsoid:

DEfil (filter peak is at +delta=delta(nz), i.e., along z axis and orthogonal to a planar ellipsoid filter in the x-y plane). (Filter peak is at positive k for positive delta.)

DEfil($\sigma$xy, $\sigma$z, delta)=exp(−(r−delta)Co(r−delta))
DEfilAlpha($\sigma$xy,$\sigma$z, delta)=exp(−(r−delta nalpha)
Calpha (r−delta nalpha)

5.3 Convolution Equivalent by Modulate-LowPass-Demodulate

GradCosOrient (vol, lambda grad_flag, orient_flag, downflag) kmag=pi/(2*lambda), lambda=1, 2, or 5
FILTSIZE=5 or 7 Number and nature of output volumes determined by fl: grad_flag=0 (none) or 1 (gradient) orient_flag=0 (none), 1 (positive cosine=ridges), 2 (negative cosine=grooves), 3 (either a ridge or a groove).

Modulate the image by a cosine wave oriented along angle nalpha Lowpass filter the image Demodulate the image by an inverse (complex conjugate) modulation of the filtered image.

For the preceding three steps, if downflag=0, operate as usual on all voxels. If downflag=1, operate on every other voxel using 2i, 2j, 2k as before.

Grad=GradCosOrient with flags set for gradient only.

Orient=GradCosOrient with flags set for positive cosine, or else an equivalent sequence of operations such as (i)

taking the gradient, and (ii) applying Near2Planes to the output of the gradient operation.

5.3 Downsampling of Filter Array

Down(filter): convolves by applying (i, j, k) filter values to voxels at positions (2i, 2j, 2k) relative to the center voxel, thereby doubling its spatial extent and allowing small-sized filters to have a larger "reach" instead of requiring a huge filter size. May need to blur the output volume to avoid accumulation of incremental differences.

5.5 Shape Analysis and Proximity Operations 5.5.1 NearScalar

NearScalar($\sigma 1$, $\sigma 2$, offset, vol, downflag, alphaflag [refnorm=refnormx, refnormy, refnormz]) [FILTSIZE=7]
Gives scalar output signifying proximity to scalar input volume within distance=offset, in any direction if alphaflag=0 (in which case refnorm needn't be specified) or in the direction along the axis of refnorm. For example, if refnorm=0,0,1 (i.e., along z axis, voxels will have positive output value if they are dorsal to the input volume.

DEfil$\alpha$plus=GenScalarFilBank(DEfil(u$\sigma 1$,$\sigma 2$, +offset))
DEfil.$\alpha$minus=GenScalarFilBank(DEfil($\sigma 1$,$\sigma 2$, −offset))
For alpha=0,5
 if alphaflag=0, weightalphaplus=weightalphaminus=1
 else
  weightalphaplus=Rectify(nalpha.refnorm)
  weightalphaminus=Rectify(−nalpha.refnorm)
 If downflag=0
  Near$\alpha$Plus=weightalphaplus Rectify(DEfil.$\alpha$plus*(vol))
  Near$\alpha$Minus=weightalphaminusRectify(DEfil$\alpha$minus*(vol)) else
  Near$\alpha$Plus=weightalphaplusRectify(Down(DEfil.$\alpha$plus*(vol)))
  Near$\alpha$Minus=weightalphaminusRectify(Down(DEfil$\alpha$minus*(vol)))
NearScalar($\sigma 1$, $\sigma 2$, offset, vol)=$\Sigma$(Near$\alpha$Plus+Near$\alpha$Minus)

NearScalar($\sigma 1$, $\sigma 2$, offset, vol) [FILTSIZE=5]
 DEfil$\alpha$plus=GenScalarFilBank(DEfil($\sigma 1$,$\sigma 2$, +offset))
 DEfil.$\alpha$minus=GenScalarFilBank(DEfil($\sigma 1$, $\sigma 2$, −offset))
 If downflag=0
  Near$\alpha$Plus=Rectify(DEfil.$\alpha$plus*(vol))
  Near$\alpha$Minus=Rectify(DEfil$\alpha$minus*(vol)) else
  Near$\alpha$Plus=Rectify(Down(DEfil.$\alpha$plus*(vol)))
  Near$\alpha$Minus=Rectify(Down(DEfil$\alpha$minus*(vol)))
NearScalar($\sigma 1$, $\sigma 2$, offset, vol)=$\Sigma$(Near$\alpha$Plus+Near$\alpha$Minus)

5.5.2 Near2Planes

Near2Planes($\sigma 1$, $\sigma 2$, delta, filtsize, downflag, gradsign, vol1.vec)
 gradsign: (+1=testing for gradient pointing away, −1=towards; 0=testing for orientation along axis); FILTSIZE=7
 DEfil$\alpha$plus=GenScalarFilBank(DEfil($\sigma 1$,$\sigma 2$, +offset))
 DEfil.$\alpha$minus=GenScalarFilBank(DEfil(($\sigma 1$,$\sigma 2$, −offset))
 For $\alpha$=0, $\alpha$max,
 If downflag=0
  If abs(gradsign)=1
   Near$\alpha$Plus=Rectify(DEfil.$\alpha$plus*(gradsign(vol1.vec).(n$\alpha$)))
   Near$\alpha$Minus=Rectify(DEfil$\alpha$minus*(−gradsign(vol1.vec).(n$\alpha$))) else
    Near$\alpha$Plus=DEfil.$\alpha$plus*|(vol1.vec).(n$\alpha$)|
    Near$\alpha$Minus=DEfil$\alpha$minus*|(vol1.vec).(n$\alpha$)|
    Near$\alpha$Both=((Near $\alpha$ plus)(Near $\alpha$ minus))^½
  else (if downflag=1
   If abs(gradsign)=1
    Near$\alpha$Plus Rectify(Down[(DEfil$\alpha$plus)*(gradsign(vol1.vec).(n$\alpha$)))])
    Near$\alpha$Minus=Rectify(Down[(DEfil$\alpha$minus)*−gradsign(vol1.vec).(n$\alpha$)]) else
    Near$\alpha$Plus=Down[DEfil$\alpha$plus*|(vol1.vec).(n$\alpha$)|]
    Near$\alpha$Minus=Down[DEfil$\alpha$minus*|(vol1.vec).(n$\alpha$)|]
    Near$\alpha$Both=((Near $\alpha$ plus)(Near $\alpha$ minus))^½
  Near2Planes.mag=Norm($\Sigma$(Near$\alpha$Both))

5.5.3 Near1At1Plane

Near1At1Plane (Invol.vec, Outvol.vec, sig.n, sig.w, delta=3, downflag, ingradsign, outgradsign, angleoffset) FILTSIZE+7
 ingradsign: (+1=testing for gradient pointing away from filter center, −1=towards)
 outgradsign (+1=testing for gradient pointing away from inner border, 1=towards, 0=orientation pointing either way)
 angleoffset: (0<=angleoffset<=1; 0 means all angles orthogonal or greater have zero contribution; 1 means only completely opposite has zero contribution, thus allowing major contribution from orthogonal)
 DEfil.$\alpha$plus=GenScalarFilBank(DEfil($\sigma 1$,$\sigma 2$, +offset))
 DEfil$\alpha$minus=GenScalarFilBank(DEfil($\sigma 1$,$\sigma 2$, −offset))
 For $\alpha$=0, $\alpha$max,
 If downflag=0,
  NearIn$\alpha$plus=Rectify (DEfil.$\alpha$plus*(Invol.mag)(angleoffset+ingradsign (Invol.norm).(n$\alpha$))
  NearIn$\alpha$minus=Rectify (DEfil.$\alpha$minus*(Invol.mag)(angleoffset−ingradsign (Invol.norm).(n$\alpha$))
  If abs(outgradsign)=1,
   AtOut$\alpha$plus=Rectify (+outgradsign(Outvol.vec).(n$\alpha$))
   AtOut$\alpha$minus=Rectify (−outgradsign(Outvol.vec).(n$\alpha$))
   NearInAtOut$\alpha$square=max((NearIn$\alpha$plus)(AtOut$\alpha$plus), (NearIn$\alpha$minus)(AtOut$\alpha$minus))
   NearInAtOut$\alpha$=Rectify((NearInAtOut$\alpha$square)^½−Invol.mag))
  else [if outgradsign=0]
   AtOut$\alpha$plus=|(Outvol.vec).(n$\alpha$)|
   NearIn$\alpha$max=max(NearIn$\alpha$plus, NearIn$\alpha$minus)
   NearInAtOut$\alpha$=Rectify(((NearIn$\alpha$max)(AtOut$\alpha$plus))^½−Invol.mag)
 else [if downflag=1]
  [repeat above, using Down[DEfil . . . ].]
 Near1At1Plane.mag=Norm($\Sigma$(AtOutNearIn$\alpha$))

5.5.4 NearInAndOut

NearInAndOut($\sigma 1$, $\sigma 2$, delta, downflag, ingradsign, outgradsign, normflag, angleoffset, Invol, Outvol)
 ingradsign: (+1=testing for gradient pointing away from filter center, −1=towards)
 outgradsign (+1=testing for gradient pointing away from filter center, 1=towards, 0=orientation pointing either way) FILTSIZE=7
 normflag (1=uses normal vector for Invol.vec; 0=uses only Invol.mag)

angleoffset: (0<=angleoffset<=1; 0 means all angles orthogonal or greater have zero contribution; 1 means only completely opposite has zero contribution, thus allowing major contribution from orthogonal)

For α=0, αamax
DEfilαplus=GenScalarFilBank(DEfil(σ1,σ2, +offset))
DEfil.αminus=GenScalarFilBank(DEfil(σ1,σ2, −offset))
If downflag=0,
  If normflag=0,
    Inplusα=Rectify(DEfilαplus*(Invol.mag)
    Inminusα=Rectify(DEfilαminus*(Invol.mag) else
    Inplusα=Rectify(DEfilαplus*(Invol.mag) (angleoffset+ingradsign (Invol.norm).(nα))
    Inminus.α=Rectify(DEfilαminus*(Invol.mag) (angleoffset−ingradsign (Invol.norm).(nα))
  If abs(outgradsign)=1,
    Outplusα=Rectify(DEfilαplus*(+outgradsign (Outvol.vec).(nα))
    Outminusα=Rectify(DEfilαminus*(−outgradsign (Outvol.vec).(nα)) else
    Outplusα=Rectify(DEfilαplus*|Outvol.vec).(nα)|
    Outminusα=Rectify(DEfilαminus*|outvol.vec).(nα)|
  Nearαplus=Combine(sqrt, Inplusα, Outminusα)
  Nearαminus=Combine(sqrt, Inminusα, Outplusα)
  NearInOut=Norm(Σ(Nearαplus+Nearαminus))
else, [if downflag=1]
same steps, except using Down(DEfilα . . . instead of DEfilα

5.5.5. Additional Shape Analysis Routines

InFold (rad, cyl, axis, Volume)
  For=0, alphamax
  CylFil=rotate CylFil (1, 2) by alpha
  InFold=(DotRectConvolve(CylFil, −InoutGrad))
  InFold.mag(1, 2,, volume)=Norm((InFold)
  InFold.norm=VecOri(InFold OutFold (rad, cyl, Volume)
  For alpha=0, alphamax
  CylFil=GenScalarFilBank(CylFil(rad, cyl, axis))
  OutFold=(DotRectConvolve(CylFil, +InOutGrad))
  OutFold.mag=Norm((OutFold)
  OutFold.norm=VecOri(OutFold)

AnyFold (rad, cyl, axis, Volume)
  For=0, alphamax
  CylFil=GenScalarFilBank(CylFil(rad, cyl, axis))
  AnyFold=(DotAbsConvolve (CylFil, InOutGrad))
  AnyFold.mag( 1, 2,,volume)=Norm((AnyFold)
  AnyFold.norm=VecOri(AnyFold)

InDent(rad, sphere, Volume)
  For alpha=0, alphamax
  BlebPlusFil=GenScalarFilBank(BlebPlusFil(rad, sphere))
  BlebMinusFil=GenScalarFilBank(BlebMinusFil(rad, sphere))
  BlebPlus=DotRectConvolve (BlebPlusFil, −InOutGrad))
  BlebMinus=DotRectConvolve (BlebMinusFil, −InOutGrad))
  BlebTotal=BlebPlus+BlebMinus
  InDent.mag=Norm((BlebTotal))
  InDent.norm=VecOri(BlebTotal)

OutBump(rad, sphere, Volume)
  For alpha=0, alphamax
  BlebPlusFil=GenScalarFilBank(BlebPlusFil(rad, sphere))
  BlebMinusFil=GenScalarFilBank(BlebMinusFil (rad, sphere))
  BlebPlus=DotRectConvolve (BlebPlusFil, +InOutGrad))
  BlebMinus=DotRectConvolve (BlebMinusFil, +InOutGrad))
  BlebTotal=BlebPlus+BlebMinu
  OutBump.mag=Norm((BlebTotal))
  OutBump.norm=VecOri(BlebTotal)

AnyBleb(rad, sphere, Volume)
  For alpha=0, alphamax
  BlebPlusFil=GenScalarFilBank(BlebPlusFil (rad, sphere))
  BlebMinusFil=GenScalarFilBank(BlebMinusFil(rad, sphere))
  BlebPlus=DotAbsConvolve(BlebPlusFil, InOutGrad))
  BlebMinus=DotAbsConvolve(BlebMinusFil, InOutGrad))
  BlebTotal=BlebPlus+BlebMinus
  InDent.mag=Norm((BlebTotal))
  InDent.norm=VecOri(BlebTotal)

Operations on surface representations.

GradFlow({surfname}, Target, Driver) Generate new surface of the same topology by driving {surfname} along the Driver vector field towards the representation of the Target boundary vector field.

RidgeFit({surfname}, Target) Generate a refined surface by treating it as a gaussian ridge and optimizing its fit to the target vector field.

SplitPrismoid({InSurf}, {OutSurf}) Generate a tiling between topologically corresponding inner and outer surface representations by splitting the volume of the prismoids formed by corresponding tiles. For a more precise estimate, the volume of each prismoid can be adjusted to include the increments or decrements associated with convexity or concavity of the inner and outer surfaces, as determined from measures of surface curvature.

SphereProject({surfname}hs) Project the hypersmoothed {surfname} to a spherical configuration.

SphereMorph({surfname}) Modify the configuration of a spherical map by multiresolution morphing that reduces distortions relative to surface area in the original 3D configuration.

What is claimed is:

1. A method for reconstructing surfaces and analyzing surface and volume representations of the shape of an object corresponding to image data, in which the object has been modeled as one or more physically distinct compartments, said method comprising the steps of:

specifying characteristics of a compartmental model in terms of the material types contained in each distinct compartment as defined by the image data and in terms of the nature of compartmental boundaries as defined by the image data;

specifying an image model that includes image intensity functions for each material type and for each boundary type based on the specified characteristics;

specifying gradient functions that characterize boundary types and some compartmental regions based on the specified characteristics;

generating a set of probabilistic volume representations of the location of different compartments and the location and orientation of compartmental boundaries based on the image intensity functions and the gradient functions; and generating a set of segmented (binary) volumes that represent structures in the vicinity of said object, including those adjoining its perimeter, in order to identify and subsequently exclude said adjoining structures from the surface reconstruction.

2. The method of claim 1 wherein the first specifying step includes specifying characteristics which define a type of adjoining material, specifying characteristics which define a topology of the compartmental boundaries, and specifying characteristics which define local shape characteristics of the compartmental boundaries.

3. The method of claim 1 wherein the generating step comprises the steps of:

transforming voxel intensity values of the image data into transformed values that reflect a feature or relationship of the image data;

combining the transformed values of corresponding voxels in two or more image volumes that assign high intensity values where there is a coincidence or correlation of evidence for the presence of a particular feature or to relationship; and systematically generating families of filter profiles that extract information about local shape characteristics related to gradients and curvature in the image intensity functions.

4. The method of claim 3 wherein the generating step further comprises the steps of:

determining a convolution of the filter profiles with an image using an algorithm that involves modulation with real and imaginary components of a wave vector, low-pass filtering of the modulated image, and subsequent demodulation with the complex conjugate of the wave vector;

collecting information about shape characteristics at a specified distance and direction from a filter origin by displacing the geometric center of the filter profile;

filtering image data using filter banks at uniform angular separation in three dimensions based on cubic geometry (3 orientations, 6 directions), dodecahedral geometry (6 orientations, 12 directions) or icosohedral geometry (10 orientation, 20 directions); and analyzing complex shape characteristics using tensor field filter banks that contain vectors at each filter voxel, and using as vector field filter banks, involving scalars at each filter voxel.

5. The method of claim 4 wherein the generating step further comprises:

selecting a sampling density that minimizes or avoids aliasing in image volumes subjected to multiple stages of filtering;

customizing a choice of transformations, filters, and shape analysis operations based on anatomical and imaging priors derived from a compartmental image model and related to the characteristics of nearby regions and boundaries;

applying these customized transformations, filters, and shape analysis operations to a set of probabilistic volume representations to generate composite measures regarding the presence of particular compartmental regions and particular boundary types;

specifying shape characteristics of slab-like regions or other dual-boundary regions by generating difference maps between opposite boundaries of a slab, determining the gradient of this boundary difference map, and determining a tensor field representation of the gradient of the gradient of the boundary difference map; and identifying regions that are likely to have a characteristic geometry such as a slab or sheet based on multiple criteria relating to the location of boundary measures and material types.

6. The method of claim 1 wherein the generating step comprises the steps of:

applying thresholding steps to the image intensity volume to generate binary representations of particular material types;

applying logical operators to multiple volumes to reflect relationships between structures segmented in different volumes; and applying morphological volume operations that modify the shape of a volume contingent on characteristics present or absent in another volume in order to further constrain the shape of a segmented region.

7. The method of claim 1 further comprising the step of generating from the set of probabilistic volume representations an explicit surface-based model representing the boundary or boundaries of individual compartments and of objects or structures as a whole.

8. The method of claim 7 wherein the step of generating an explicit surface-based model comprises the steps of:

initially segmenting the image data to provide a topologically accurate representation of a compartmental boundary by thresholding of an appropriate probabilistic measure;

generating a topologically closed surface from a segmented volume; and removing portions of this surface that lie exterior to the compartment of interest to create an initial surface representation for the compartment.

9. The method of claim 8 wherein the step of initially segmenting includes generating a difference map between opposite boundaries of a slab-like region after masking to exclude regions not belonging to the slabs, and further comprising the steps of:

generating separate initial representations of each of the boundaries of slab-like regions using gradient descent to drive the initial surface representation (i) along an axis defined by the gradient of the boundary difference map; and (ii) towards the peak of the probabilistic measure of boundary location;

refining this initial slab surface using a gaussian ridge model of the surface to fit it to a composite vector field measure of a particular boundary;

generating a middle surface representation whose shape is intermediate between inner and outer surfaces and which divides the cortex into equal volumes above and below.

10. A method for reconstructing surfaces and analyzing surface and volume representations of the shape of an organ, such as a brain, corresponding to image data, said method comprising the steps of:

conditioning and masking the image data including identifying white matter and restricting the volume of interest;

generating a segmented map of subcortical structures that adjoin the natural margins of cerebral neocortex or to closely approach the cortical gray matter;

generating probabilistic structural maps within the masked image data and generating volumetric initial estimates of the cortical gray matter;

generating and parameterizing a topologically representative initial surface representation from the structural maps and from the volumetric initial estimates; and generating a full cortical model from the initial surface representation.

11. The method of claim 10 wherein the step of conditioning and masking comprises the steps of:

conditioning the image data;

generating an intensity gradient map;

segmenting white matter; and creating a shell around the white matter for masking the inner boundary and another shell for masking the outer boundary.

12. The method of claim 10 wherein the step of generating segmented subcortical structures comprises the steps of:

segmenting the lateral ventricle, the basal ganglia, the thalamus, the brainstem, the hippocampus, the amygdala, cerebral white matter, the corpus callosum, large cerebral blood vessels, and structures in the orbit of the eye;

obtaining these segmentations using combinations of steps including thresholding, flood-filling, dilation, erosion, smearing, sculpting, and logical volume combinations specified so as to segment each structure.

13. The method of claim 10 wherein the first generating step comprises the steps of:

assembling the conditioned and masked image data into an inner cortical boundary;

assembling the conditioned and masked image data into an outer cortical boundary;

assembling the conditioned and masked image data into cortical gray matter;

generating a difference map between the inner and outer cortical boundaries; and generating representations of landmarks from the difference map.

14. The method of claim 10 wherein the second generating step comprises the steps of:

segmenting the outer cortical boundary;

generating an initial cortical surface from the segmented outer cortical boundary;

resampling the generated initial cortical surface; and generating a topological closed surface, including smooth representations of the noncortical gap, from the resampled surface.

15. The method of claim 10 wherein the full cortical model includes reconstructions of the inner, middle, and outer surfaces and a three-dimensional parameterization having two axes within the middle surface and a third along the estimated radial axis of the cortex.

16. The method of claim 15 wherein a Fiducial Initial Cortical Surface (FICS) is generated, and wherein the step of generating a full cortical model comprises the steps of:

driving the FICS into close registration with the inner boundary estimate using a surface deformation method;

driving the FICS into close registration with the outer boundary estimate using the surface deformation method;

generating a parameterized representation of the cortical volume; and analyzing a tensor field of the cortical geometry.

* * * * *